US012649650B2

(12) United States Patent
Jenkusky et al.

(10) Patent No.: US 12,649,650 B2
(45) Date of Patent: Jun. 9, 2026

(54) MULTIFUNCTIONAL PUMPING ASSEMBLY

(71) Applicant: T.J. Clark International, LLC, Delaware, OH (US)

(72) Inventors: Jacob Thomas Jenkusky, Lewis Center, OH (US); Michael Christopher Crumb, Delaware, OH (US)

(73) Assignee: T.J. Clark International, LLC, Delaware, OH (US)

( * ) Notice: Subject to any disclaimer, the term of this patent is extended or adjusted under 35 U.S.C. 154(b) by 157 days.

(21) Appl. No.: 18/731,985

(22) Filed: Jun. 3, 2024

(65) Prior Publication Data

US 2024/0400371 A1 Dec. 5, 2024

Related U.S. Application Data

(60) Provisional application No. 63/470,513, filed on Jun. 2, 2023.

(51) Int. Cl.

| | |
|---|---|
| ***B67D 7/62*** | (2010.01) |
| ***B67D 7/04*** | (2010.01) |
| ***B67D 7/36*** | (2010.01) |
| ***B67D 7/76*** | (2010.01) |

(52) U.S. Cl.

CPC ................ *B67D 7/62* (2013.01); *B67D 7/04* (2013.01); *B67D 7/36* (2013.01); *B67D 7/76* (2013.01); *Y10T 137/6855* (2015.04); *Y10T 137/86107* (2015.04); *Y10T 137/86171* (2015.04)

(58) Field of Classification Search

CPC ... B67D 7/04; B67D 7/06; B67D 7/36; B67D 7/58; B67D 7/62; B67D 7/76; Y10T 137/6855; Y10T 137/6881; Y10T 137/6899; Y10T 137/6914; Y10T 137/6954; Y10T 137/85978;

(Continued)

(56) References Cited

U.S. PATENT DOCUMENTS

| | | | |
|---|---|---|---|
| 5,349,980 | A | 9/1994 | Spiegel |
| 5,553,673 | A | 9/1996 | Hackman |

(Continued)

FOREIGN PATENT DOCUMENTS

| | | | |
|---|---|---|---|
| WO | WO2017202601 | A1 | 11/2017 |

OTHER PUBLICATIONS

Androutsopoulos, Konstantinos N., "Modeling and solving the fuel distribution problem with unloading precedence and loading sequence considerations"; Annals of Operations Research (2024) 332:909-947.

*Primary Examiner* — Kenneth Rinehart
*Assistant Examiner* — Jonathan J Waddy
(74) *Attorney, Agent, or Firm* — Forge IP, PLLC

(57) ABSTRACT

A pumping assembly for a fuel delivery vehicle having main and auxiliary inlets, an outlet, and one or more hose connections. A pump moves fluid through the assembly, and the fluid can pass through a filter separator to remove contaminants. A specific manifold in combination with multiple, two-way valves enable control of the fluid flow to produce multiple fluid pathways. At least ten different configurations are available depending on the need. The assembly is mounted in a frame that is mounted to a vehicle, such as a fuel truck. In some cases, sensors are employed to measure and monitor various parameters throughout the assembly.

21 Claims, 25 Drawing Sheets

(58) Field of Classification Search
CPC ..... Y10T 137/86107; Y10T 137/86171; F17D 1/14; F17D 1/20
USPC ........... 137/899, 899.4, 351, 355.12, 355.26, 137/565.01, 565.26, 565.35
See application file for complete search history.

(56) References Cited

U.S. PATENT DOCUMENTS

| | | | | |
|---|---|---|---|---|
| 6,772,802 | B2 * | 8/2004 | Few | F01M 11/04 141/2 |
| 7,506,673 | B2 | 3/2009 | Palmer | |
| 7,856,998 | B2 | 12/2010 | Bauer | |
| 8,499,782 | B2 | 8/2013 | Bauer | |
| 9,010,481 | B2 | 4/2015 | Merth | |
| 10,894,709 | B2 | 1/2021 | Van Wyk | |
| 11,905,864 | B2 | 2/2024 | Hatch | |
| 2021/0188616 | A1 | 6/2021 | Shock | |
| 2022/0212592 | A1 | 7/2022 | Kriese | |

* cited by examiner

MULTIFUNCTIONAL PUMPING ASSEMBLY

FIELD OF THE INVENTION

The present invention relates to a pumping assembly for a fuel delivery vehicle. More specifically, the invention relates to such an assembly with a particular manifold and sequence of valves that permit the user to generate many different flow configurations that may be required for the fuel delivery vehicle.

BACKGROUND OF THE INVENTION

While fuel is often obtained at filling stations, there is often a need for mobile delivery. Various types of mobile fuel dispensers, such as standard tanker trucks, have been employed for carrying and dispensing fuel at needed locations.

The transport and dispensing of fuel in such situations can sometimes present challenges, as is often the case, for example, when delivering fuel to mobile military units and expeditionary bases. In such scenarios, it is often necessary to fill the fuel tanks of remotely located vehicles or provide fuel at temporary installations in order to run generators, heaters, and the like, or to provide for the temporary storage of fuel in containers at that remote site. Such fueling destinations, which may be in need of regular replenishment and may have varied locations, require both speed and adaptability of the mobile refueling units in order to be able to quickly receive, transfer, and dispense fuel.

What is desired, therefor, is a delivery system that can be mounted to a vehicle for mobile fuel delivery. What is further desired is a fuel delivery system that is multifunctional, such that various fuel pumping configurations can be accomplished with the same assembly. What is also desired is such an assembly that is structural sound, yet sufficiently compact, to facilitate rapid and efficient mobility.

SUMMARY OF THE INVENTION

Accordingly, it is an object of the present invention to provide a fuel delivery system that can be mounted to a vehicle.

It is also an object of the present invention to provide a fuel delivery system that has multiple flow configurations.

It is a further object of the present invention to provide a fuel delivery system with an efficient, compact design.

In order to achieve at least some of the objects and advantages listed, the invention comprises a multifunctional pumping assembly for a fuel delivery vehicle, including a main inlet, an auxiliary inlet, a main outlet, one or more hose connections for connecting one or more corresponding hoses to the assembly, a pump for pumping fluid through the assembly, a filter separator for removing contaminants from the fluid being pumped through the assembly by the pump, a first main valve through which fluid flows from the main inlet to the pump when in an open position, a second main valve through which fluid flows from the pump to the filter separator when in an open position, a third main valve through which fluid from the pump flows when in an open position, a fourth main valve through which fluid from the filter separator flows when in an open position, a fifth main valve through which fluid flows from the fourth main valve toward the main outlet when in an open position, a sixth main valve through which fluid flows from the fourth main valve toward the main inlet when in an open position, one or more main hose connection valves corresponding to the one or more hose connections through with fluid flows to the corresponding hose connection when in an open position, and one or more auxiliary hose connection valves corresponding to the one or more hose connections through which fluid from the corresponding hose connection flows when in an open position.

In advantageous embodiments, the assembly further includes a main outlet valve through which fluid flows to the main outlet when in an open position, and an auxiliary inlet valve through which fluid flows from the auxiliary inlet.

In advantageous embodiments, the assembly further includes a first fluid pathway along which fluid flows through the main inlet, through the first main valve, through the pump, through the second main valve, through the filter separator, through the fourth main valve, through the fifth main valve, through the main outlet valve, and through the main outlet; a second fluid pathway along which fluid flows through the main inlet, through the first main valve, through the pump, through the third main valve, through the main outlet valve, and through the main outlet; a third fluid pathway along which fluid flows through the auxiliary inlet, through auxiliary inlet valve, through the pump, through the second main valve, through the filter separator, through the fourth main valve, through the fifth main valve, through the main outlet valve, and through the main outlet; a fourth fluid pathway along which fluid flows through the auxiliary inlet, through auxiliary inlet valve, through the pump, through the third main valve, through the main outlet valve, and through the main outlet; a fifth fluid pathway along which fluid flows through the one or more hose connections, through the one or more auxiliary hose connection valves, through the pump, through the second main valve, through the filter separator, through the fourth main valve, through the sixth main valve, and through the main inlet; a sixth fluid pathway along which fluid flows through the one or more hose connections, through the one or more auxiliary hose connection valves, through the pump, through the third main valve, through the fifth main valve, through the sixth main valve, and through the main inlet; a seventh fluid pathway along which fluid flows through the auxiliary inlet, though the auxiliary inlet valve, through the pump, through the second main valve, through the filter separator, through the fourth main valve, through the sixth main valve, and through the main inlet; an eighth fluid pathway along which fluid flows through the auxiliary inlet, through the auxiliary inlet valve, through the pump, through the third main valve, through the fifth main valve, through the sixth main valve, and through the main inlet; a ninth fluid pathway along which fluid flows through the main inlet, through the first main valve, through the pump, through the second main valve, through the filter separator, and through the one more main hose connection valves; and a tenth fluid pathway along which fluid flows through the auxiliary inlet, though the auxiliary inlet valve, through the pump, through the second main valve, through the filter separator, and through the one more main hose connection valves.

In certain embodiments, the one or more hose connections comprise first and second hose connections, each hose connection having a corresponding main hose connection valve and a corresponding auxiliary hose connection valve.

In certain advantageous embodiments, the first, second, third fourth, fifth, and sixth main valves are pneumatically operated valves, and the main outlet, auxiliary inlet, main hose connection, and auxiliary hose connection valves are manually operated valves. In some cases, each of the valves is a butterfly valve.

In some embodiments, the invention further includes an engine that drives the pump.

In certain embodiments, the invention further includes at least one sensor for measuring at least one parameter of the assembly. In some of these embodiments, the at least one sensor includes at least one of a sensor that measures discharge pressure at an outlet of the filter separator, and a sensor that measures negative pressure at an inlet of the pump.

In certain advantageous embodiments, the invention further includes a frame for mounting the pumping assembly to vehicle. In some cases, the invention further includes one or more hoses secured to the frame. In advantageous embodiments, the invention further includes a fuel truck to which the frame is mounted.

DETAILED DESCRIPTION OF THE INVENTION

The following detailed description illustrates the technology by way of example, not by way of limitation, of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

Figure 1:
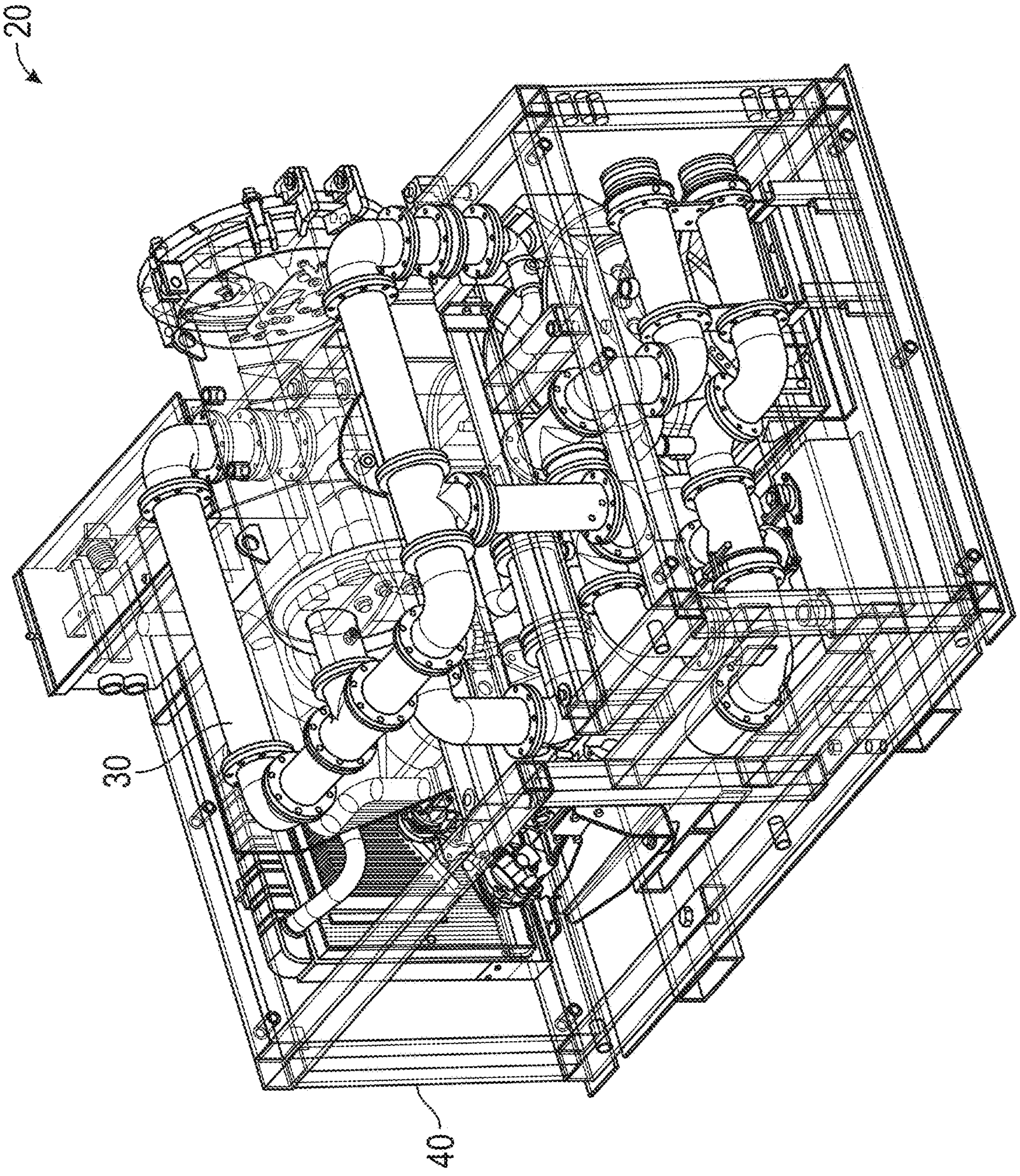
FIG. 1 is an isometric front view of a multi-configuration pumping assembly mounted in a frame according to the invention.

FIG. 1 illustrates one exemplary embodiment of an assembly (20) in accordance with the invention. A manifold (30) is mounted in a frame (40), which can in turn be mounted to a vehicle, as is further described below.

Figure 2A:
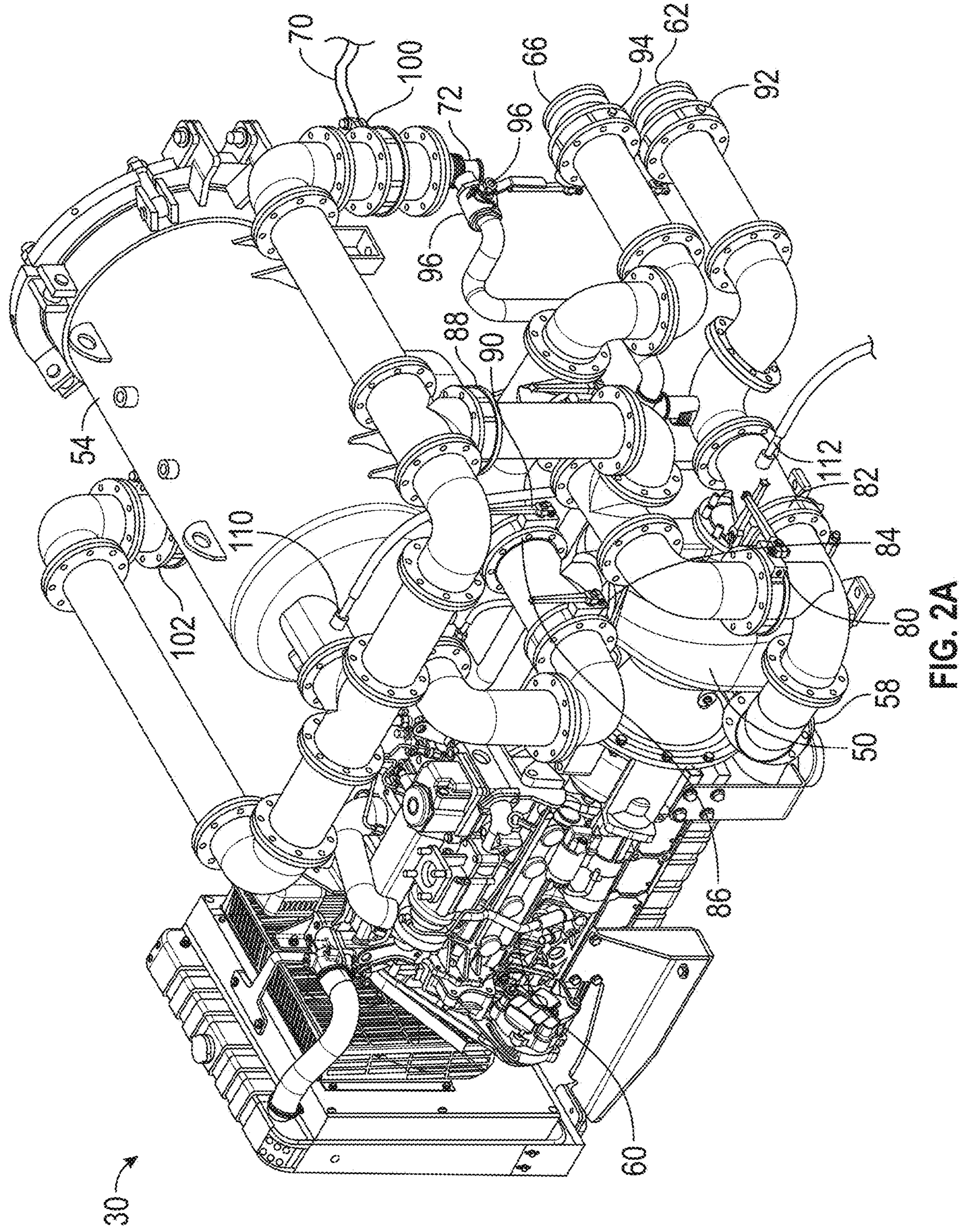
FIG. 2A is an isometric front view of the pumping assembly of FIG. 1 without the frame.
Figure 2B:
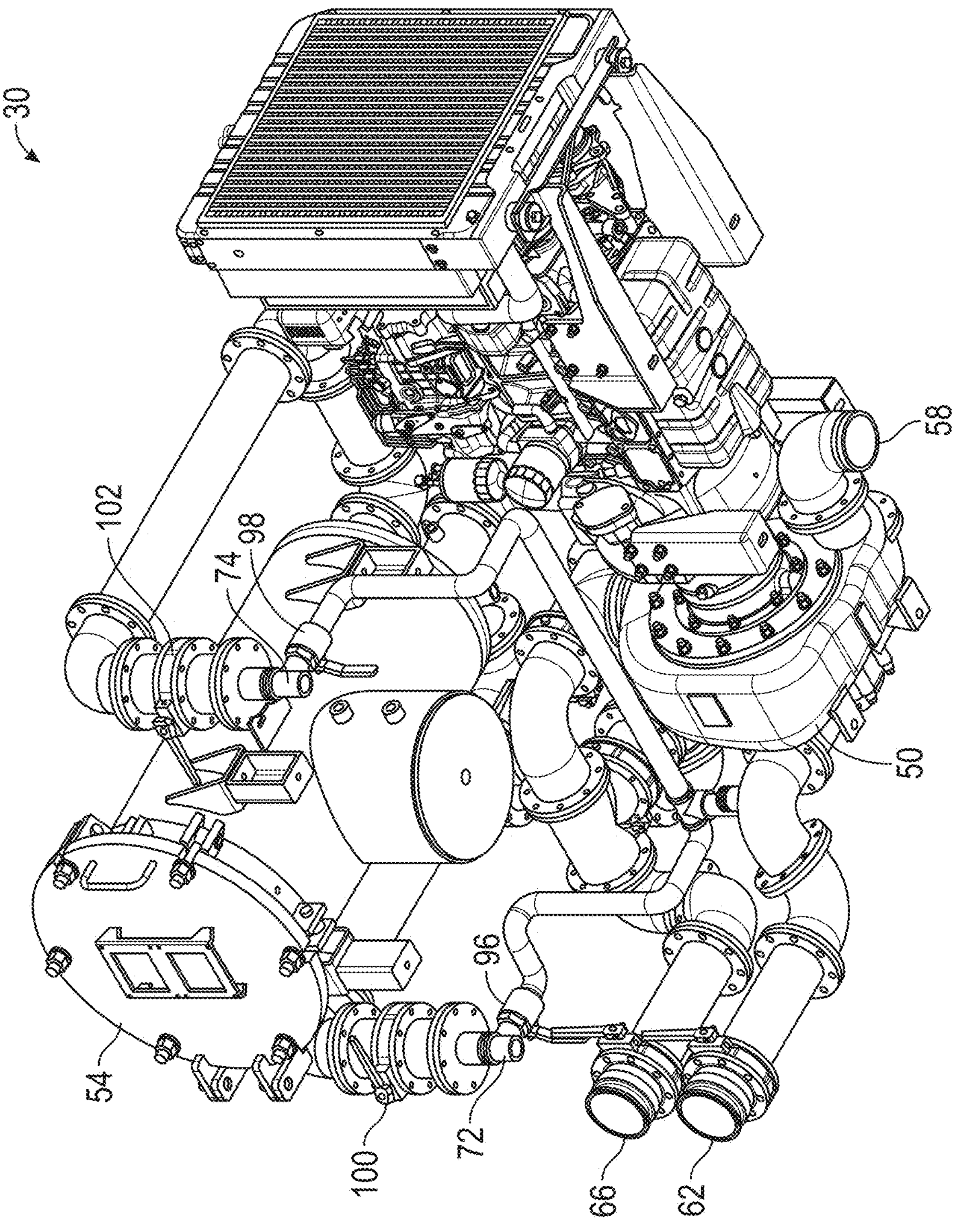
FIG. 2B is an isometric rear view of the pumping assembly of FIG. 2A.
Figure 2C:
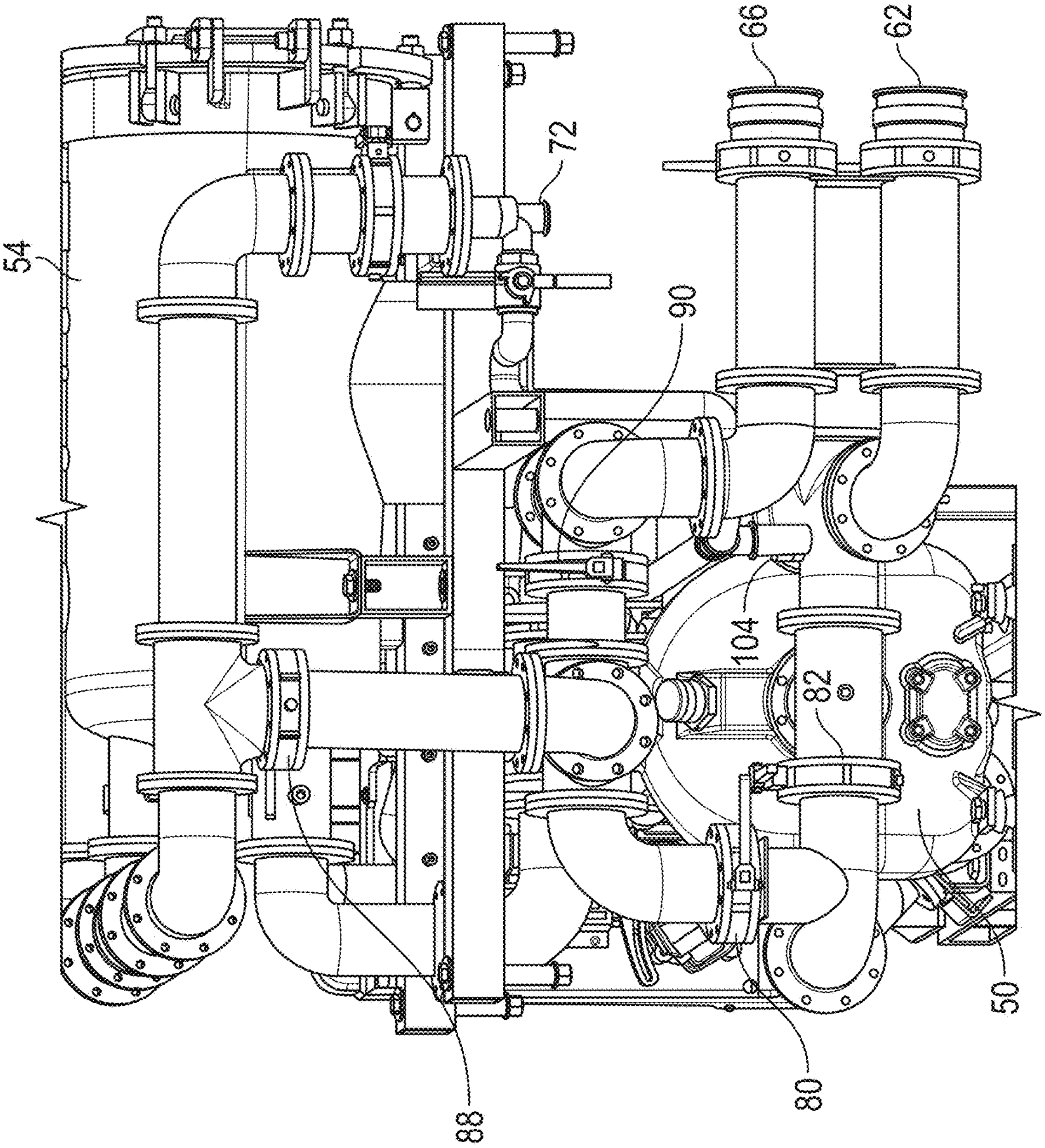
FIG. 2C is an isometric side view of the pumping assembly of FIG. 2A.

As shown in FIGS. 2A-B, the manifold (30) includes a series of conduits that interconnect a pump (50), which is powered by a diesel engine (60), a filter separator (54), a main inlet (58), an auxiliary inlet (62), and a main outlet (66). In certain advantageous embodiments, one or more hose connections (72, 74) are also interconnected therewith.

Preferably, the manifold conduits take the form of piping made of aluminum, stainless or galvanized steel, or schedule 80 PVC. In preferred embodiments, the pump (50) is capable of providing fuel flow rates between 40 gallons per minute (GPM) and 750 gallons per minute (GPM), and the filter separator (54) is capable of filtering fuel up to 350 gallons per minute (GPM).

The assembly includes a number of valves positioned at various locations along the manifold's conduits, which can be switched between open and closed positions in order to modify the direction of fluid flow. By actuating these valves in specific combinations, many different configurations can be achieved.

A first main valve (82) is positioned such that, when in an open position, fluid flows from the main inlet (58) to the pump (50). Near the outlet of the pump (50), a second main valve (84) and third main valve (86) are positioned such that, when the second main valve (84) is in an open position and the third main valve (86) is in a closed position, fluid flows from the pump (50) to an inlet of the filter separator (54), whereas, when the third main valve (86) is in an open position and the second main valve (84) is in a closed position, fluid flows from the pump (50) toward the main outlet (66).

Near each hose connection (72, 74) is a corresponding main hose connection valve (100, 102), and a fourth main valve (88) is positioned such that, when the one or more main hose connection valves (100, 102) are open and the fourth main valve (88) is closed, fluid flows from the an outlet of the filter separator (54) to the one or more hose connections, whereas, when the main hose connection valves (100, 102) are closed and the fourth main valve (88) is open, fluid flows from an outlet of the filter separator (54) through the fourth main valve (88).

A fifth main valve (90), and a sixth main valve (80) are positioned such that, when the fifth main valve (90) is in an open position and the sixth main valve (80) is in a closed position, fluid flows from the fourth main valve (88) towards the main outlet (66), whereas, when the sixth main valve (80) is in an open position and the fifth main valve (90) is in a closed position, fluid flows from the fourth main valve (88) to the main inlet (58).

Near each hose connection (72, 74) is also a corresponding auxiliary hose connection valve (96, 98) such that, when the valves (96, 98) are in an open position and the corresponding main hose connection valve (100, 102) is closed, fluid entering through the hose connection (72, 74) will flow through the corresponding auxiliary hose connection valve (96, 98).

A main outlet valve (94) is positioned near the main outlet (66), such that, when the valve (94) is in an open position, fluid can flow out through the main outlet (66). An auxiliary inlet valve (92) is positioned near the auxiliary inlet, such that, when the valve (92) is in an open position, fluid can flow in through the auxiliary inlet (62).

Due to the unique design of the manifold, by opening specific combinations of valves, one is able to create a variety of different flow paths for the fluid, and is able to achieve at least ten different configurations, as is described in further detail below.

In certain advantageous embodiments, the valves (92), (94), (96), (98), (100), and (102), which are located adjacent to external connections, are manually activated valves, in order to minimize size and cost, while the internal valves (80), (82), (84), (86), (88), and (90) are pneumatically-actuated valves, due to the more restricted accessibility to the valves when the manifold (30) is mounted in the frame (40). These air-operated valves are each supplied with air via a hose (70) for this purpose. Both the manually operated and the pneumatically operated valves may be of the butterfly, gate, or ball type.

Figure 3A:
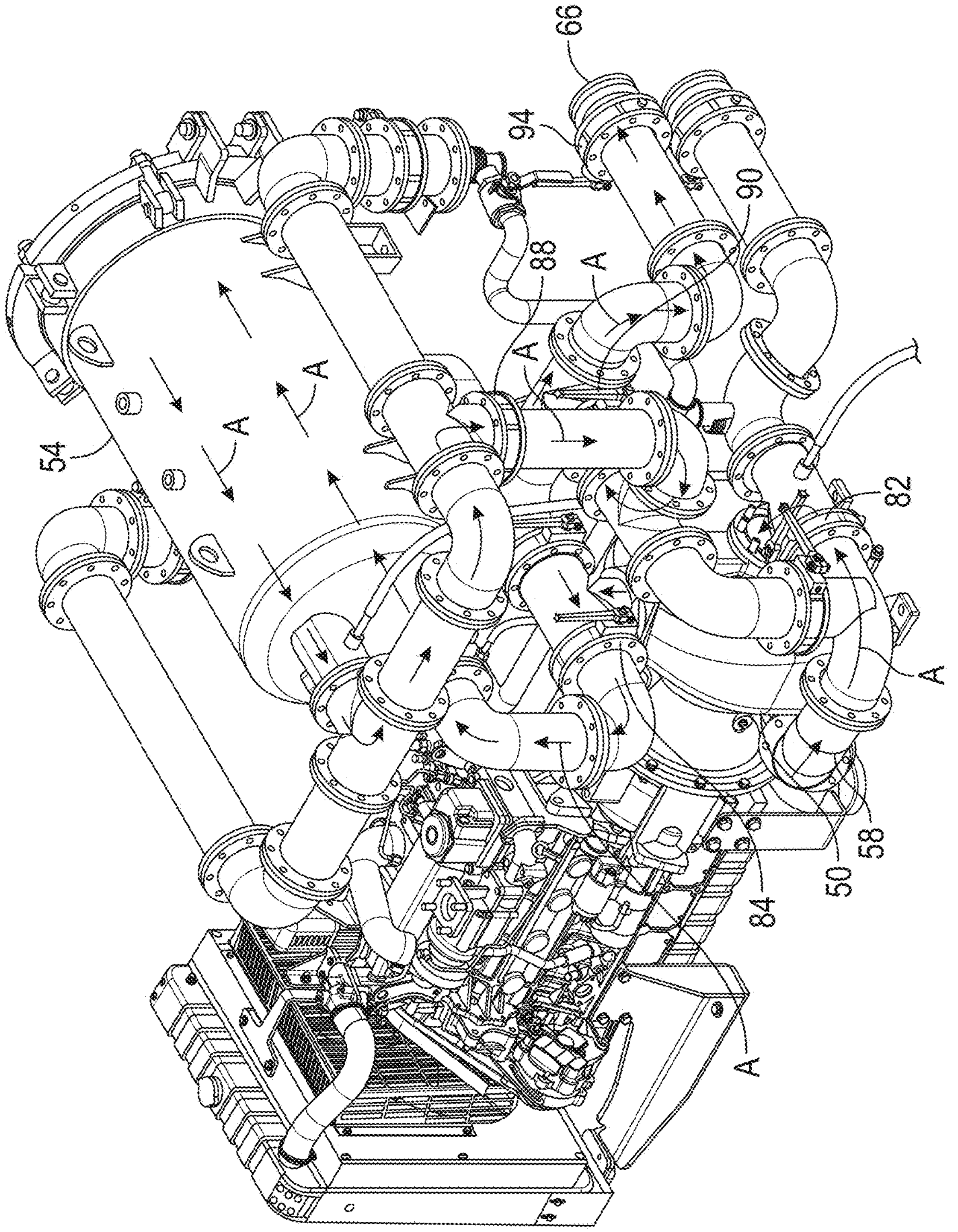
FIG. 3A is an isometric front view of the pumping assembly of FIGS. 2A-C in a configuration for bulk delivery of fuel supplied by a vehicle's tank and subsequently filtered.
Figure 3B:
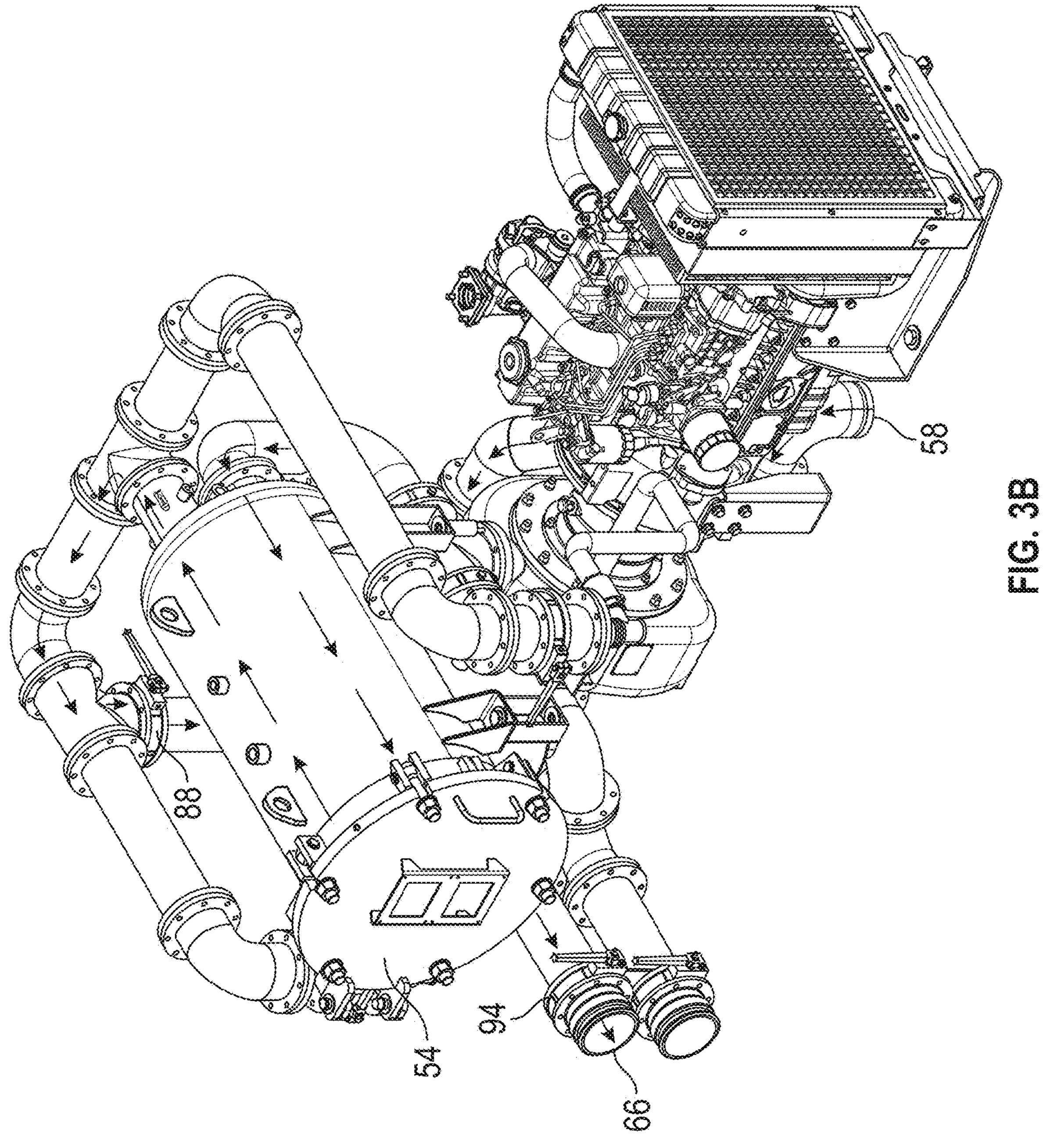
FIG. 3B is an isometric rear view of the pumping assembly of FIG. 3A.

Referring to FIGS. 3A-B, a configuration for bulk delivery of fuel supplied by a vehicle's tank and subsequently filtered is depicted. In this configuration, air actuated valve (82), air actuated valve (84), air actuated valve (88), and air actuated valve (90), as well as manual valve (94) adjacent the main outlet (66) are all open, such that fuel travels along fluid pathway A. In fluid pathway A, the fuel travels through the main inlet (58), through valve (82) and into the pump (50), out of the pump (50) and through valve (84), and into the filter separator (54). After the fuel exits the filter separator (54), it flows through valve (88), through value (90), and through valve (94), before exiting through the main outlet (66).

Figure 4A:
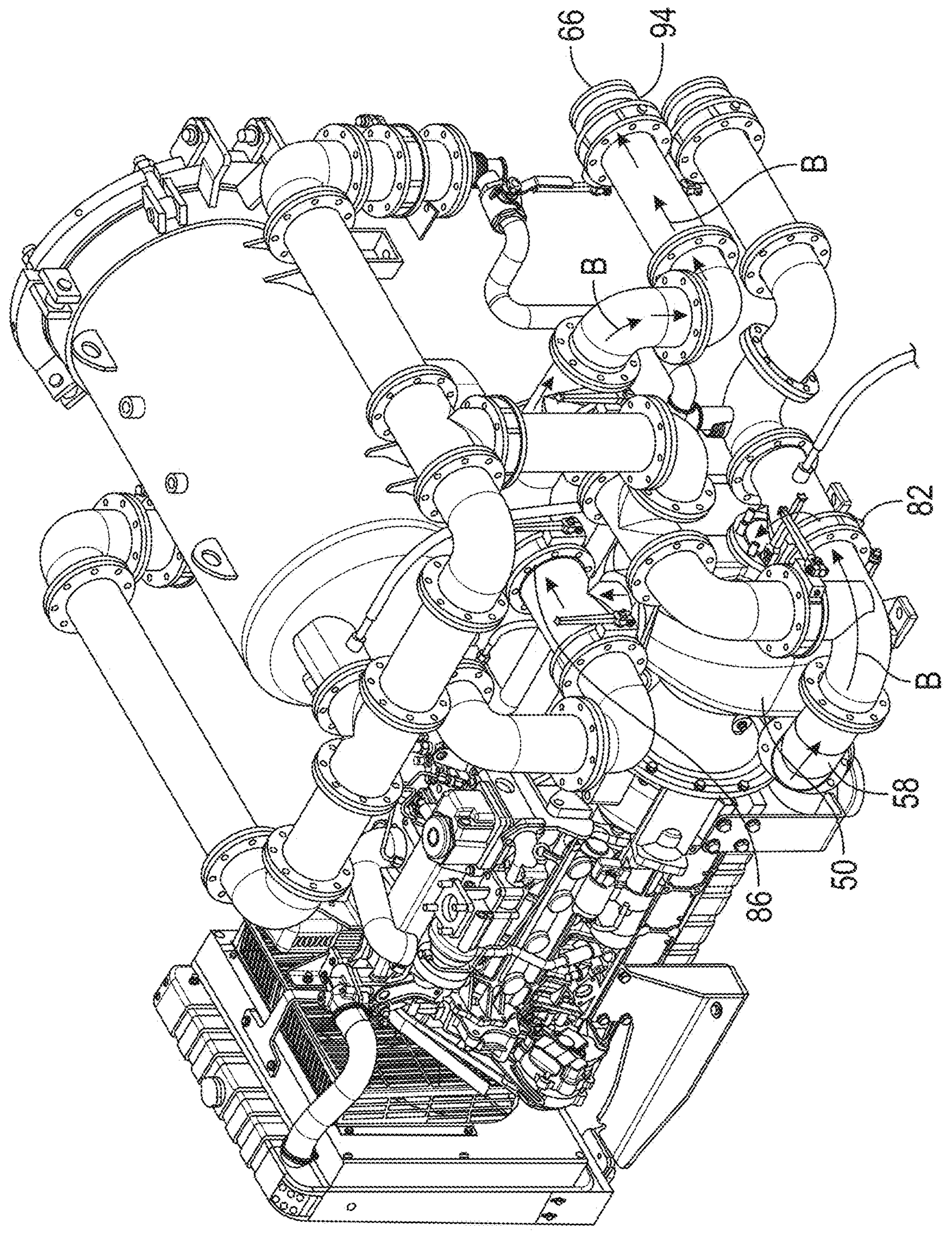
FIG. 4A is an isometric front view of the pumping assembly of FIGS. 2A-C in a configuration for bulk delivery of fuel supplied by a vehicle's tank but not filtered.
Figure 4B:
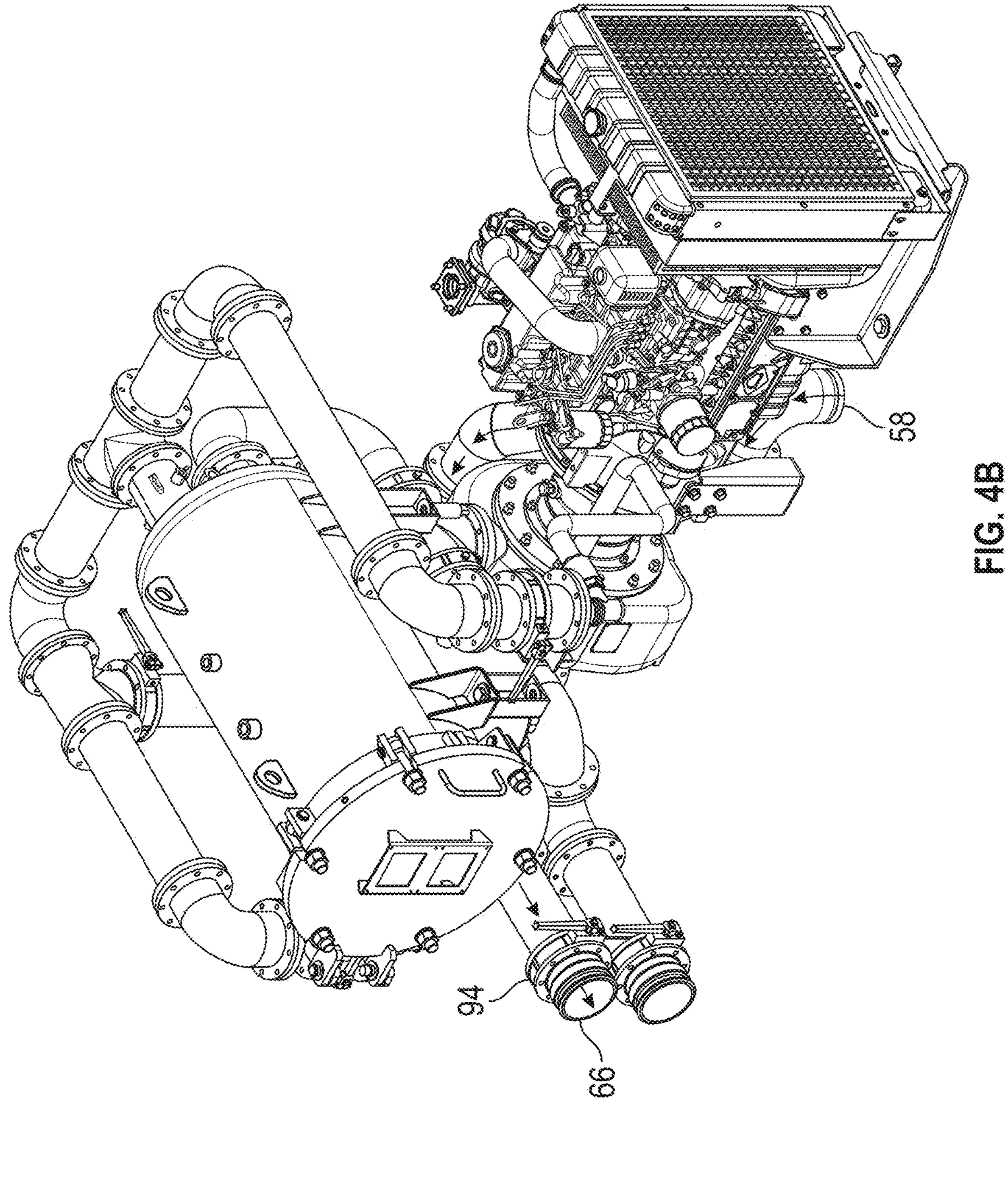
FIG. 4B is an isometric rear view of the pumping assembly of FIG. 4A.

Referring to FIGS. 4A-B, a configuration for bulk delivery of fuel supplied by a vehicle's tank but not filtered is depicted. In this configuration, air actuated valve (82), air actuated valve (86), and manual valve (94) are all open, and fuel travels along fluid pathway B. In fluid pathway B, the fuel travels through the main inlet (58), through valve (82) and into the pump (50), out of the pump (50) and through valve (86), then through valve (94), before exiting through the main outlet (66).

Figure 5A:
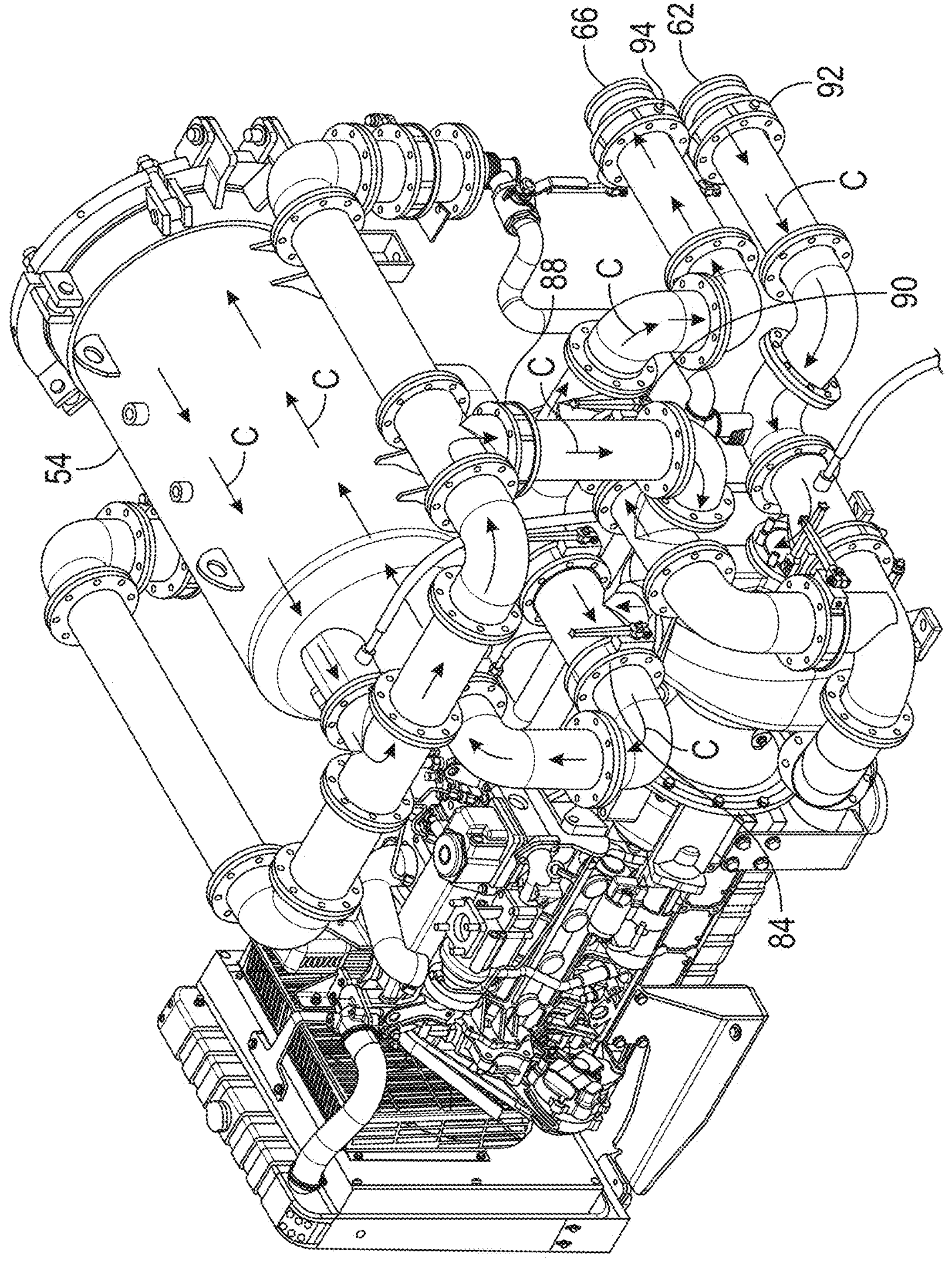
FIG. 5A is an isometric front view of the pumping assembly of FIGS. 2A-C in a configuration for bulk delivery of fuel supplied by an auxiliary source and subsequently filtered.
Figure 5B:
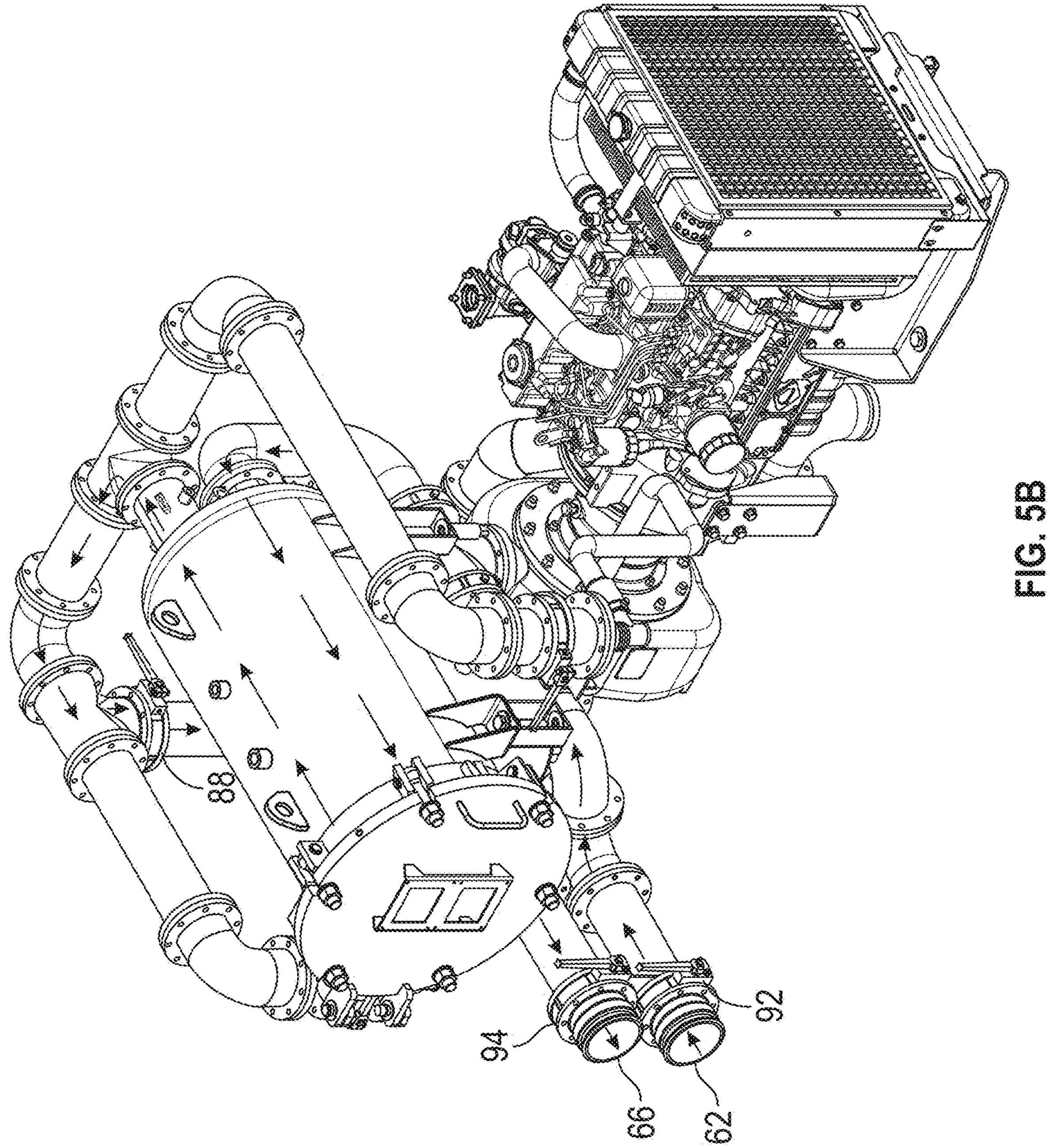
FIG. 5B is an isometric rear view of the pumping assembly of FIG. 5A.

Referring to FIGS. 5A-B, a configuration for bulk delivery of fuel supplied by an auxiliary source and subsequently filtered is depicted. In this configuration, manual valve (92) located adjacent the auxiliary inlet (62) is open, and air actuated valve (84), air actuated valve (88), air actuated valve (90), as well as manual valve (94) adjacent the main outlet (66), are also open, such that fuel travels along fluid pathway C. In fluid pathway C, the fuel travels through the auxiliary inlet (62), through valve (92) and into the pump (50), out of the pump (50) and through valve (84), and into the filter separator (54). After the fuel exits the filter separator (54), it flows through valve (88), valve (90), and valve (94), before exiting through the main outlet (66).

Figure 6A:
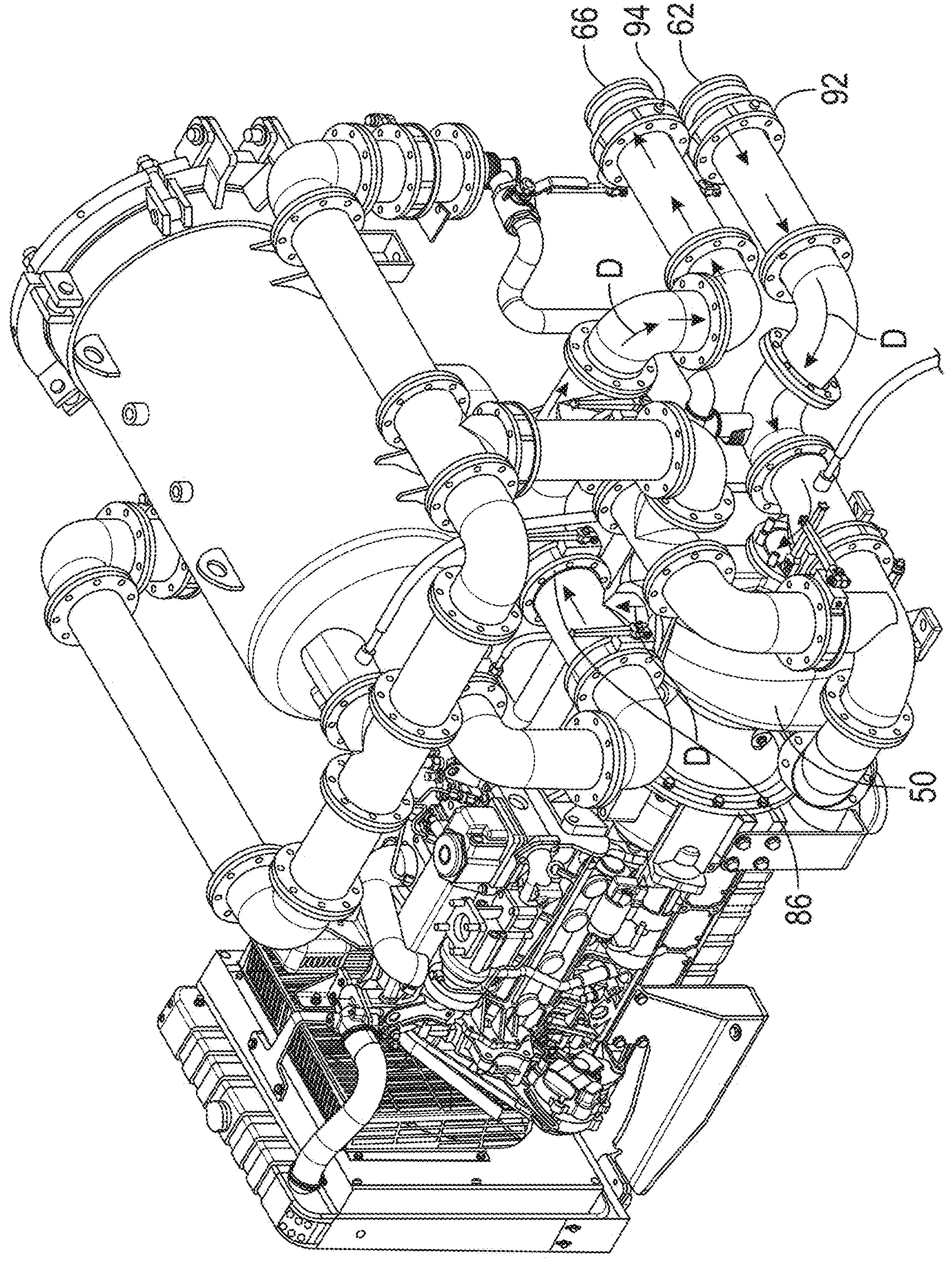
FIG. 6A is an isometric front view of the pumping assembly of FIGS. 2A-C in a configuration for bulk delivery of fuel supplied by an auxiliary source and not filtered.
Figure 6B:
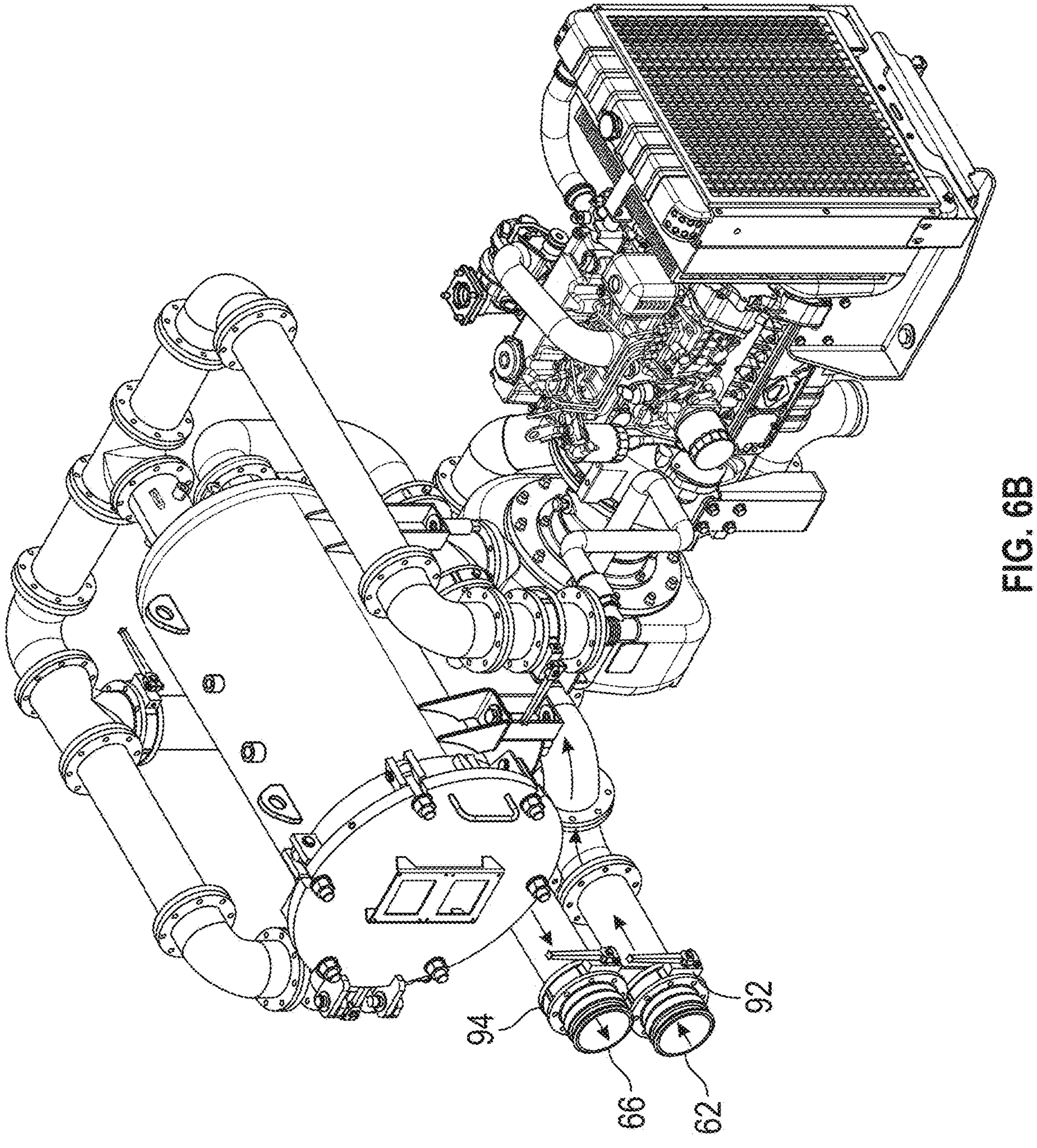
FIG. 6B is an isometric rear view of the pumping assembly of FIG. 6A.

Referring to FIGS. 6A-B, a configuration for bulk delivery of fuel supplied by an auxiliary source and not filtered is depicted. In this configuration, manual valve (92) located adjacent the auxiliary inlet (62), air actuated valve (86), and manual valve (94) adjacent the main outlet (66) are open, and fuel travels along fluid pathway D. In fluid pathway D, the fuel travels through the auxiliary inlet (62), through valve (92) and into the pump (50), out of the pump (50) and through valve (86), then through valve (94), before exiting through the main outlet (66).

Figure 7A:
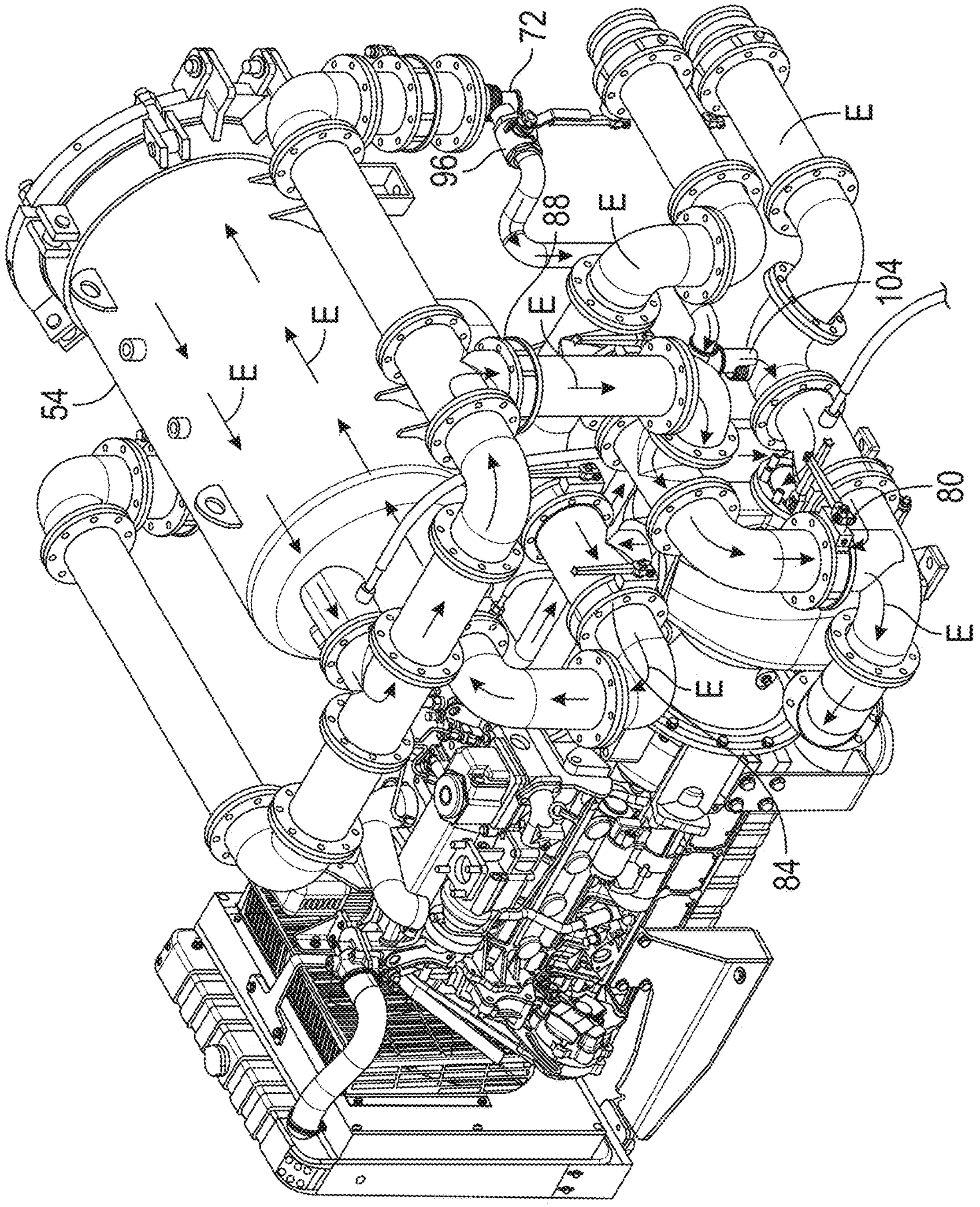
FIG. 7A is an isometric front view of the pumping assembly of FIGS. 2A-C in a configuration for a system purge including filtering.
Figure 7B:
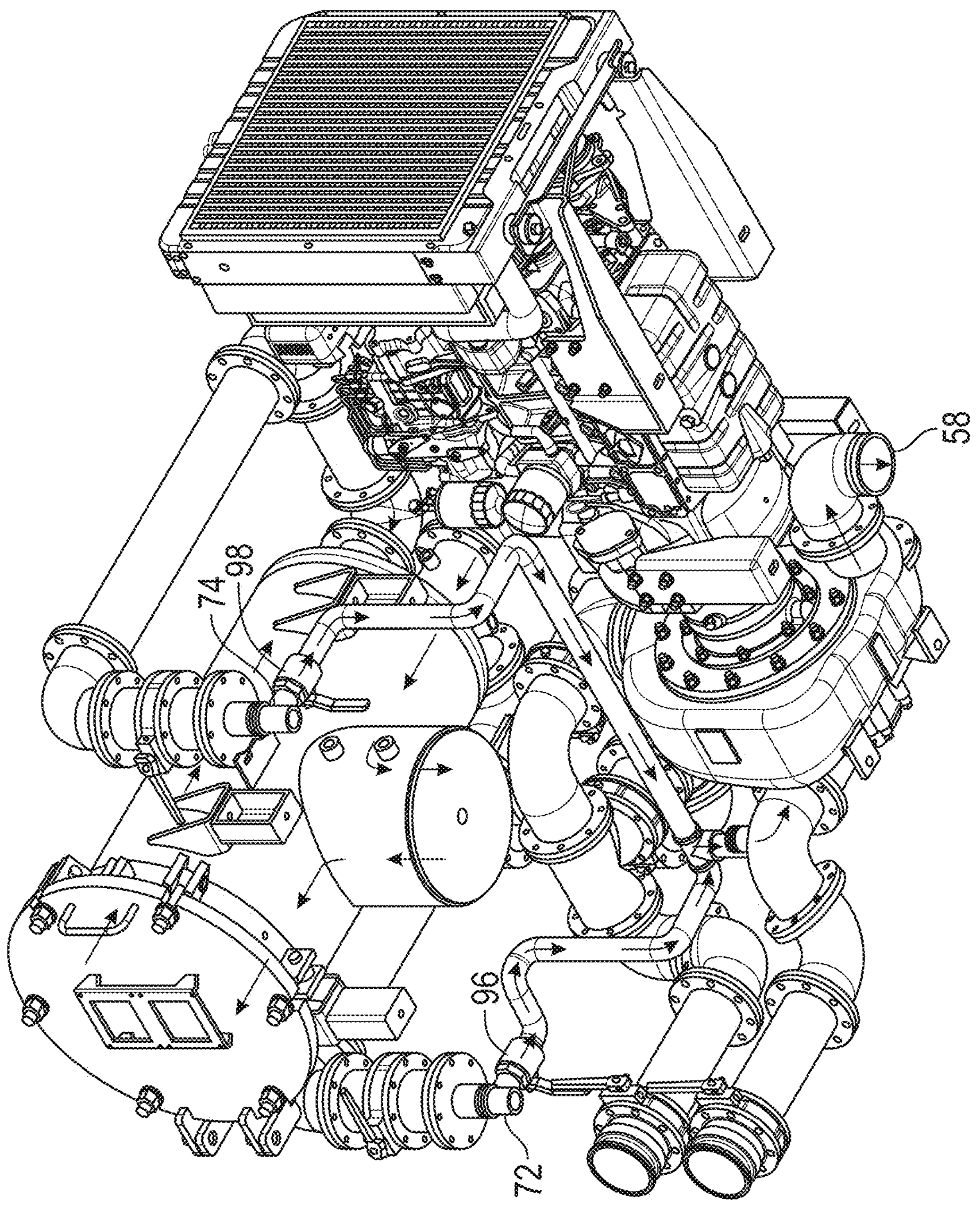
FIG. 7B is an isometric rear view of the pumping assembly of FIG. 7A.

Referring to FIGS. 7A-B, a configuration for a system purge including filtering is depicted. In this configuration, manual valves (96, 98) adjacent the hose connections (72, 74) are open, and air actuated valve (84), air actuated valve (80), and air actuated valve (88) are also open, such that fuel travels along fluid pathway D. In fluid pathway D, fluid is drawn through the hose connections (72, 74) and travels through valves (96, 98) to a purge junction (104), into the pump (50), out of the pump (50) and through valve (84), and into the filter separator (54). The fluid then exits the filter separator (54), flows through valve (88), through valve (80), and through the main inlet (58) to the tank.

Figure 8A:
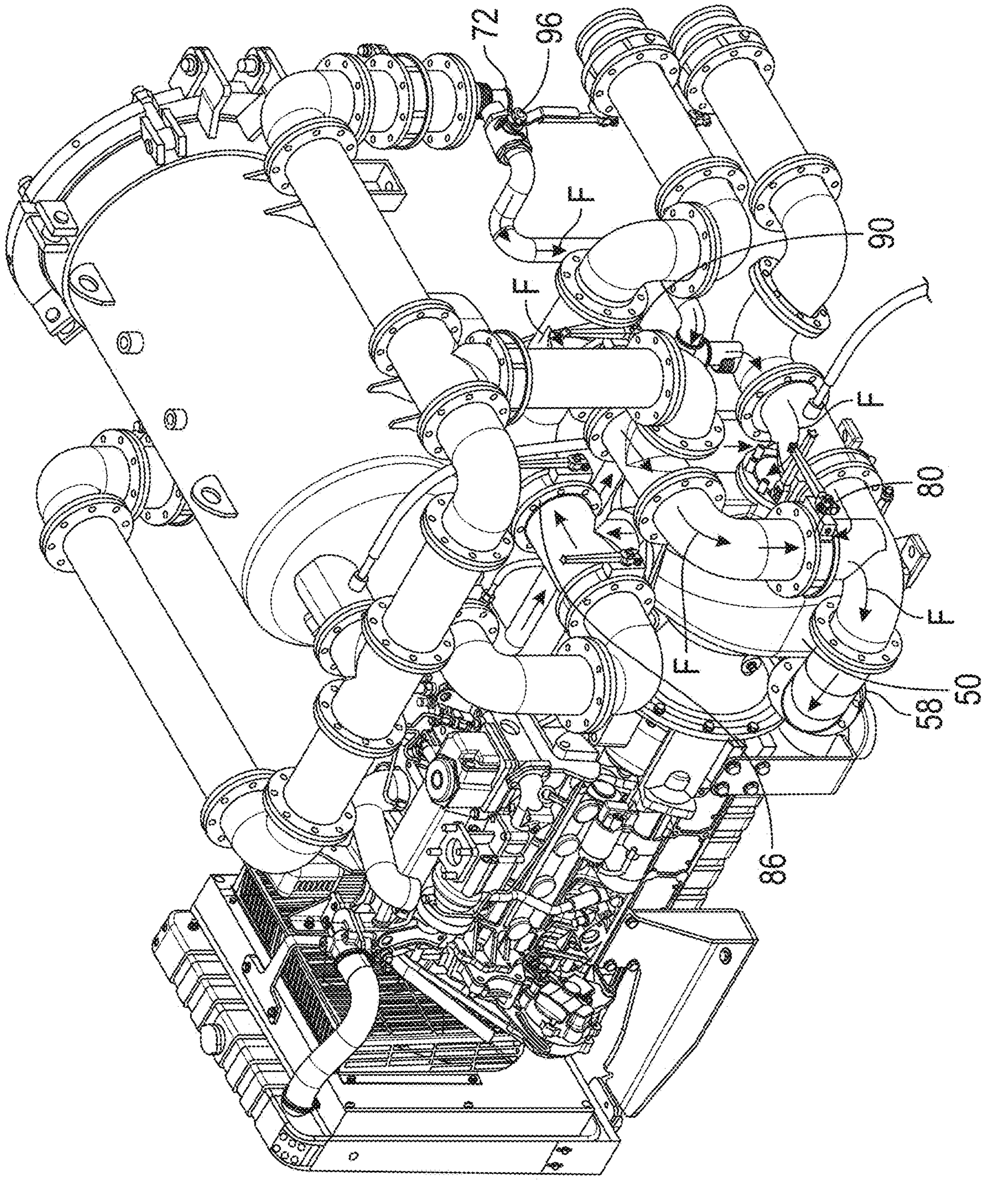
FIG. 8A is an isometric front view of the pumping assembly of FIGS. 2A-C in a configuration for a system purge that does not include filtering.
Figure 8B:
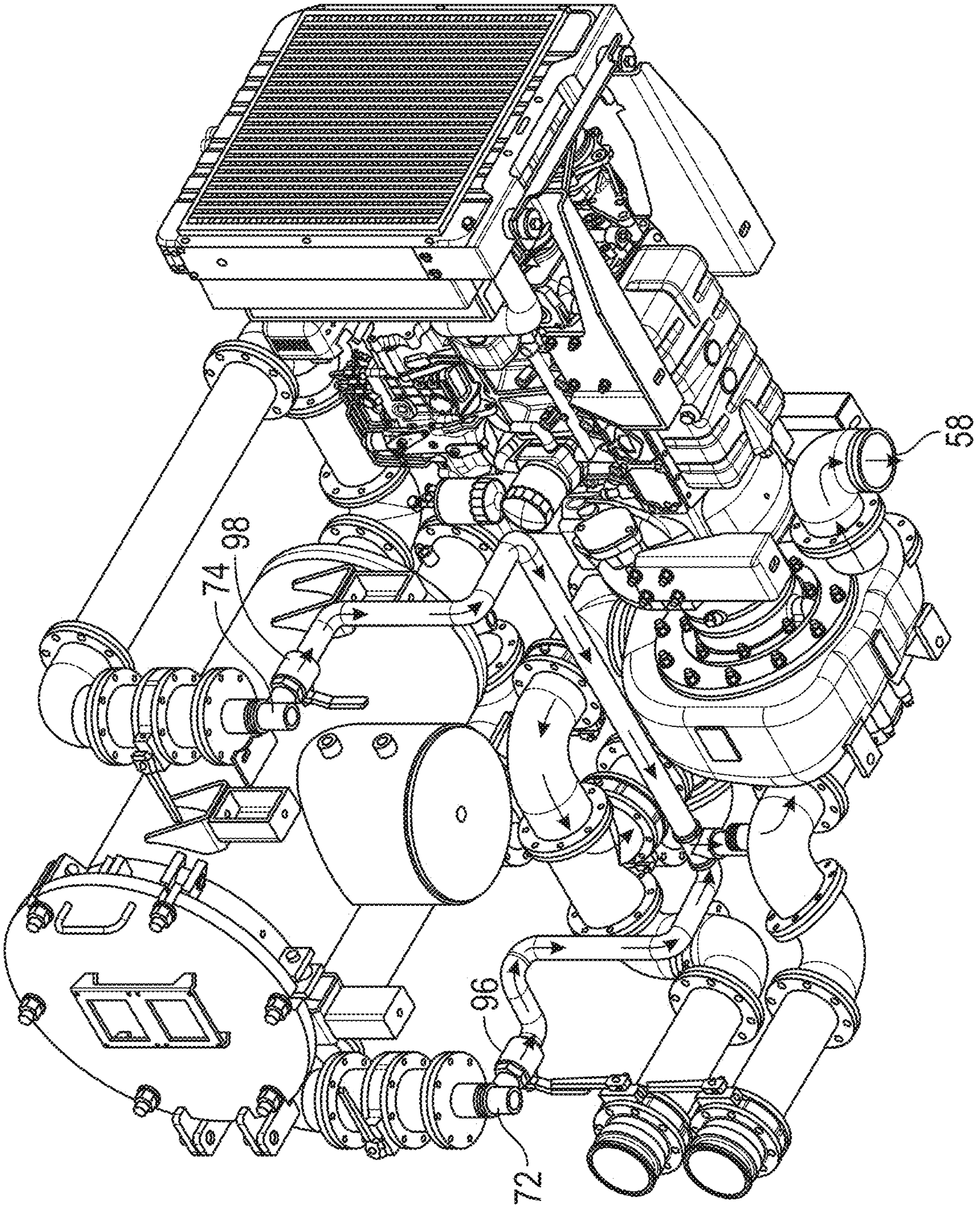
FIG. 8B is an isometric rear view of the pumping assembly of FIG. 8A.

Referring to FIGS. 8A-B, a configuration for a system purge that does not include filtering is depicted. In this configuration, manual valves (96, 98) adjacent the hose connections (72, 74) are open, and air actuated valve (86), air actuated valve (90), and air actuated valve (80) are open, such that fuel travels along fluid pathway E. In fluid pathway E, fluid is drawn through the hose connections (72, 74) and travels through valves (96, 98) to a purge junction (104), into the pump (50), out of the pump (50) and through valve (86), through valve (90), through valve (80), and through the main inlet (58) to the tank.

Figure 9A:
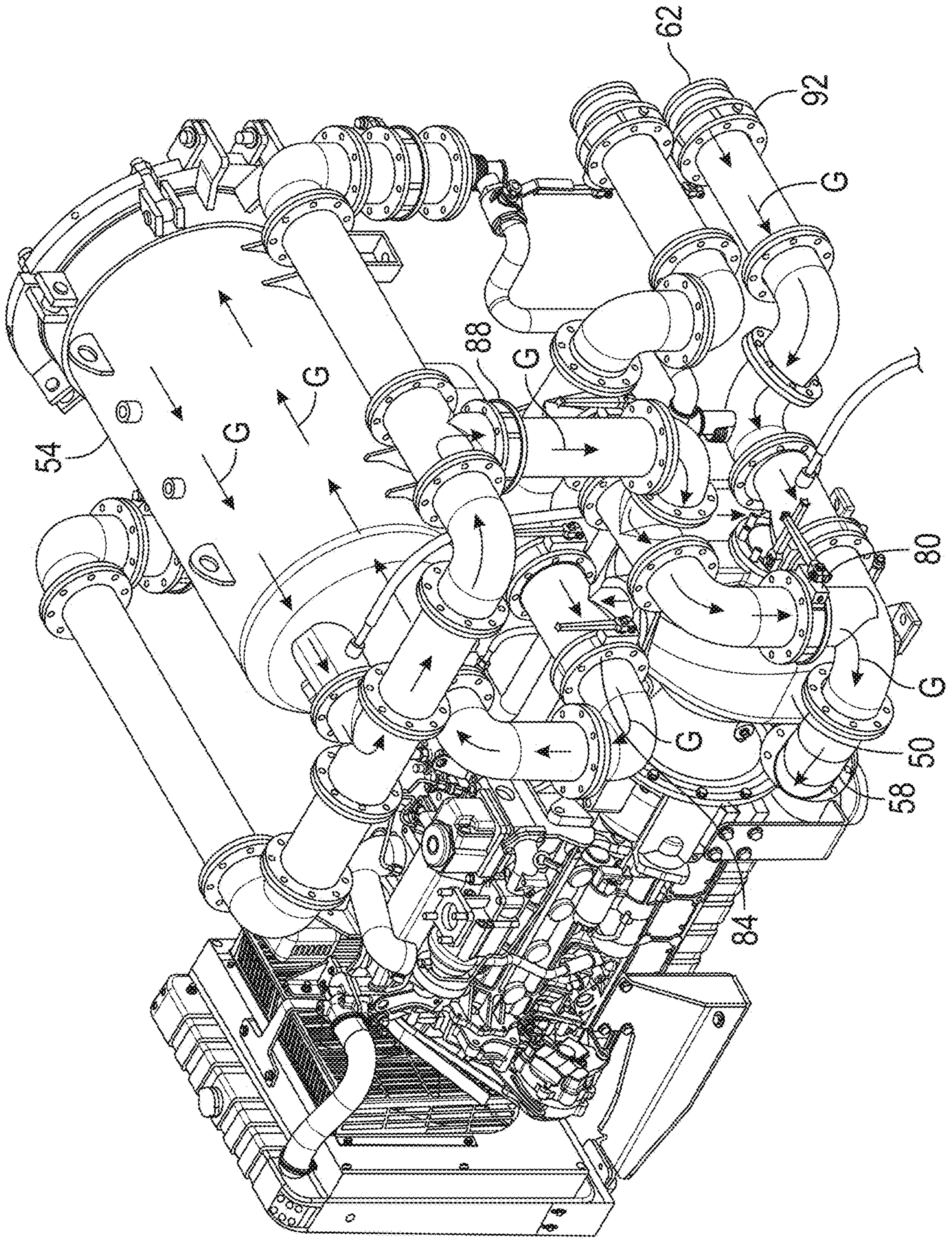
FIG. 9A is an isometric front view of the pumping assembly of FIGS. 2A-C in a configuration for self-loading with filtering.
Figure 9B:
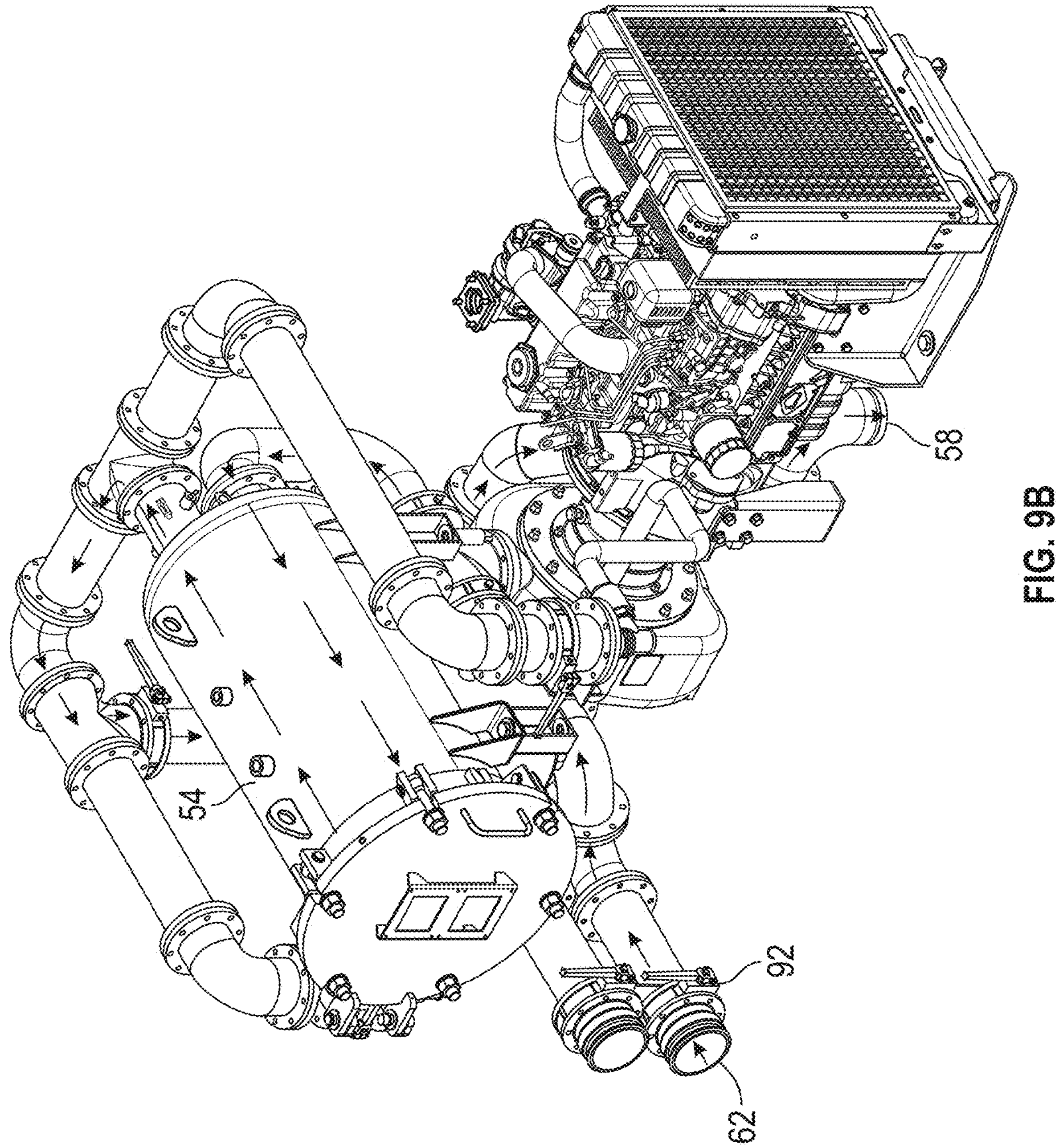
FIG. 9B is an isometric rear view of the pumping assembly of FIG. 9A.

Referring to FIGS. 9A-B, a configuration for self-loading with filtering is depicted. In this configuration, manual valve (92) adjacent the auxiliary inlet (62) is open, and air actuated valve (84), air actuated valve (88), and air actuated valve (80) are also open, such that the fuel travels along fluid pathway G. In fluid pathway G, the fuel travels through the auxiliary inlet (62), though valve (92) and into the pump (50), out of the pump (50) and through valve (84), and into the filter separator (54). The fuel flows out of the filter separator (54), through valve (88), through valve (80), and then out through the main inlet (58) to the tank.

Figure 10A:
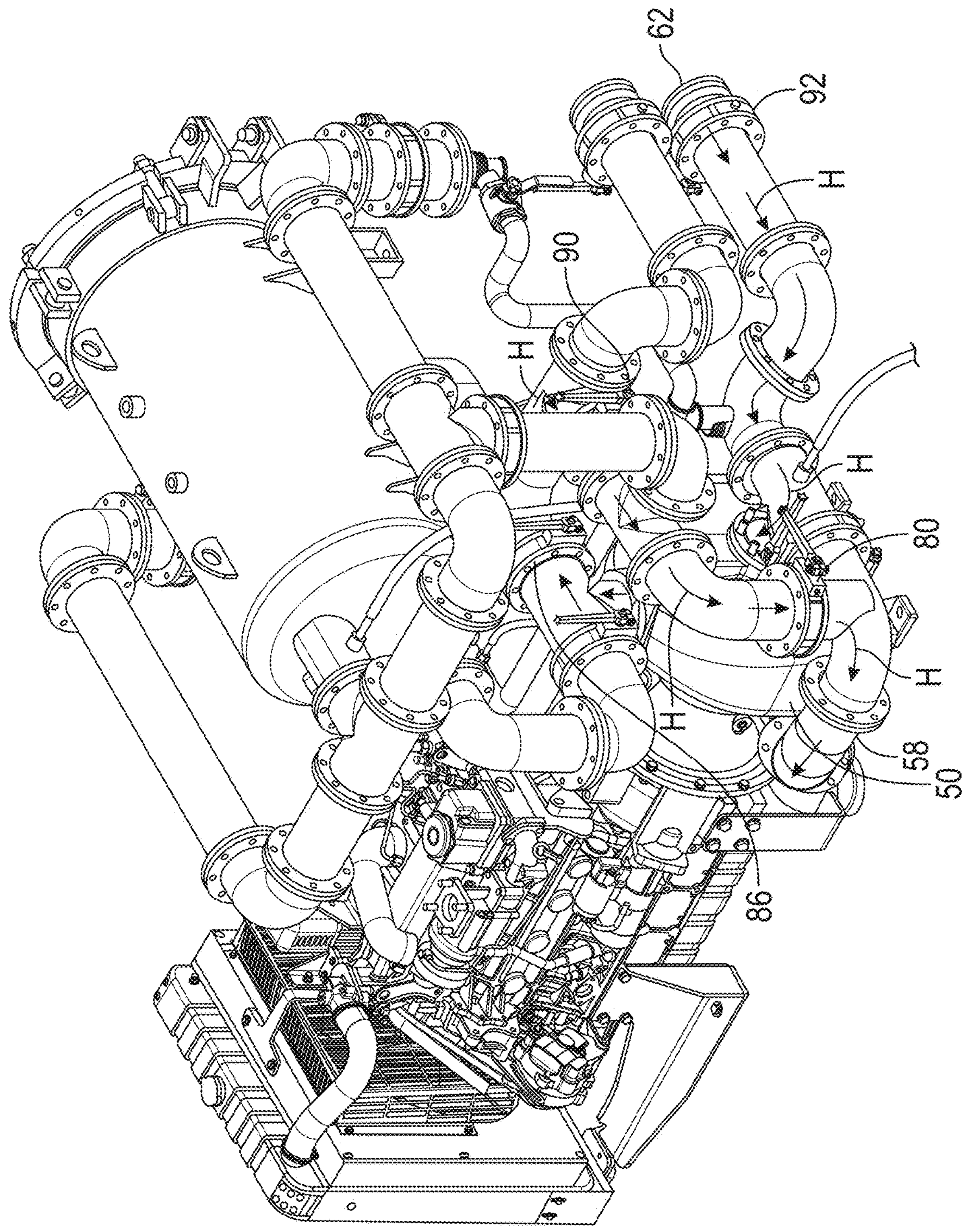
FIG. 10A is an isometric front view of the pumping assembly of FIGS. 2A-C in a configuration for self-loading without filtering.
Figure 10B:
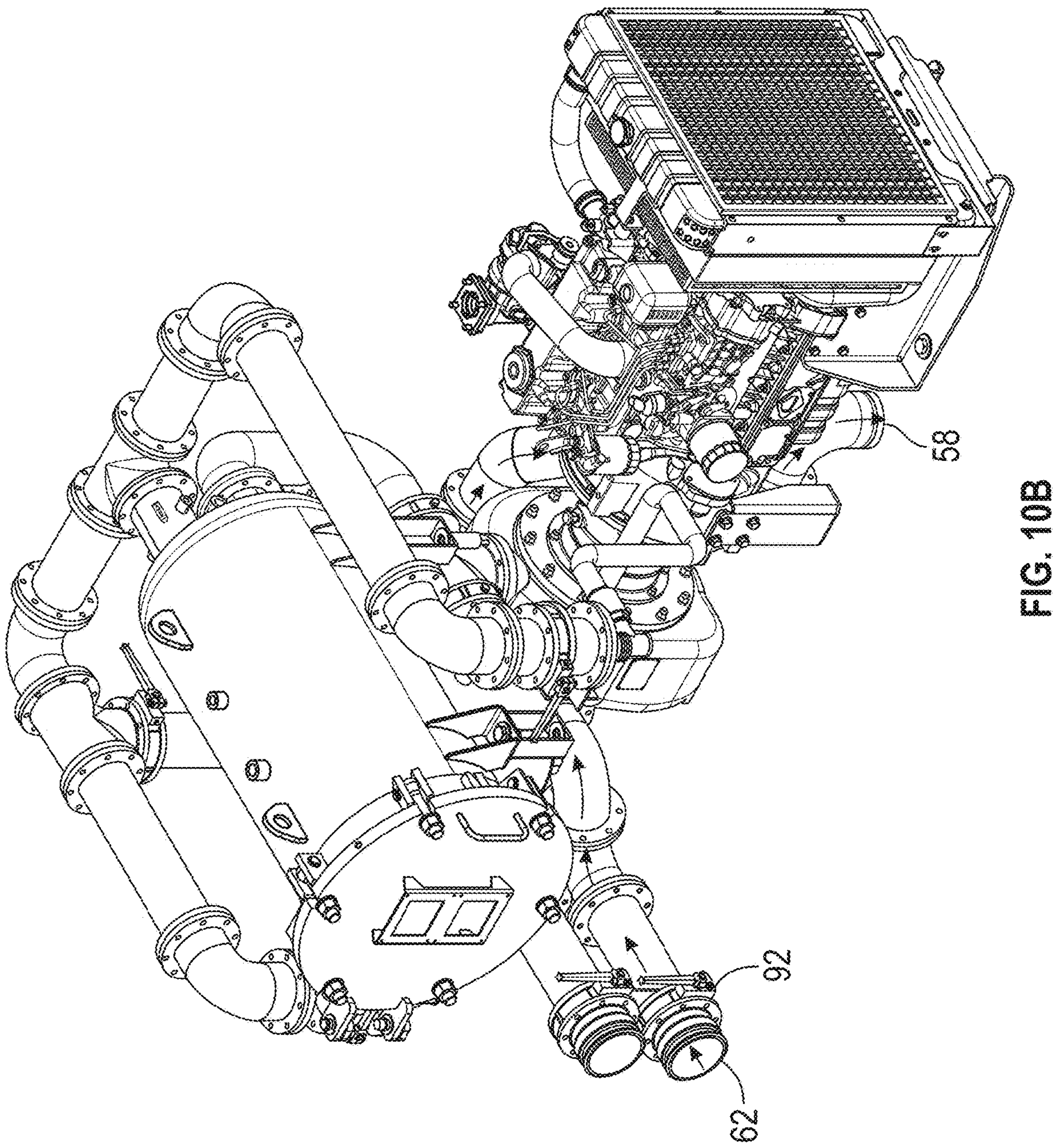
FIG. 10B is an isometric rear view of the pumping assembly of FIG. 10A.

Referring to FIGS. 10A-B, a configuration for self-loading without filtering is depicted. In this configuration, manual valve (92) adjacent the auxiliary inlet (62) is open, and air actuated valve (86), air actuated valve (90), and air actuated valve (80) are also open, and the fuel travels along fluid pathway H. In fluid pathway H, the fuel travels through the auxiliary inlet (62), through valve (92) and into the pump (50), out of the pump (50) and through valve (86), through valve (90), through valve (80), and then through the main inlet (58) to the tank.

Figure 11A:
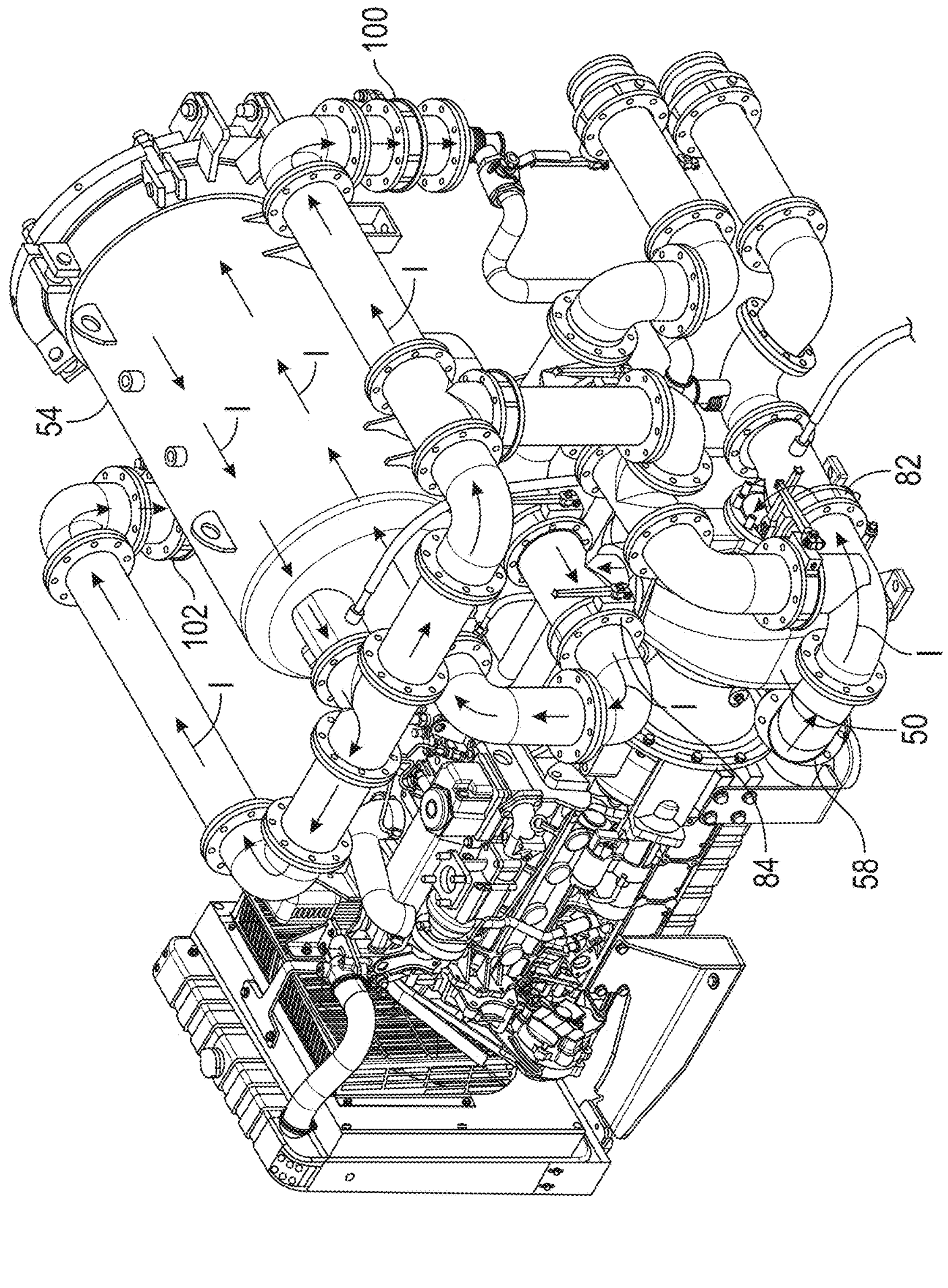
FIG. 11A is an isometric front view of the pumping assembly of FIGS. 2A-C in a configuration for retail delivery of fuel supplied by the vehicle's tank and subsequently filtered.
Figure 11B:
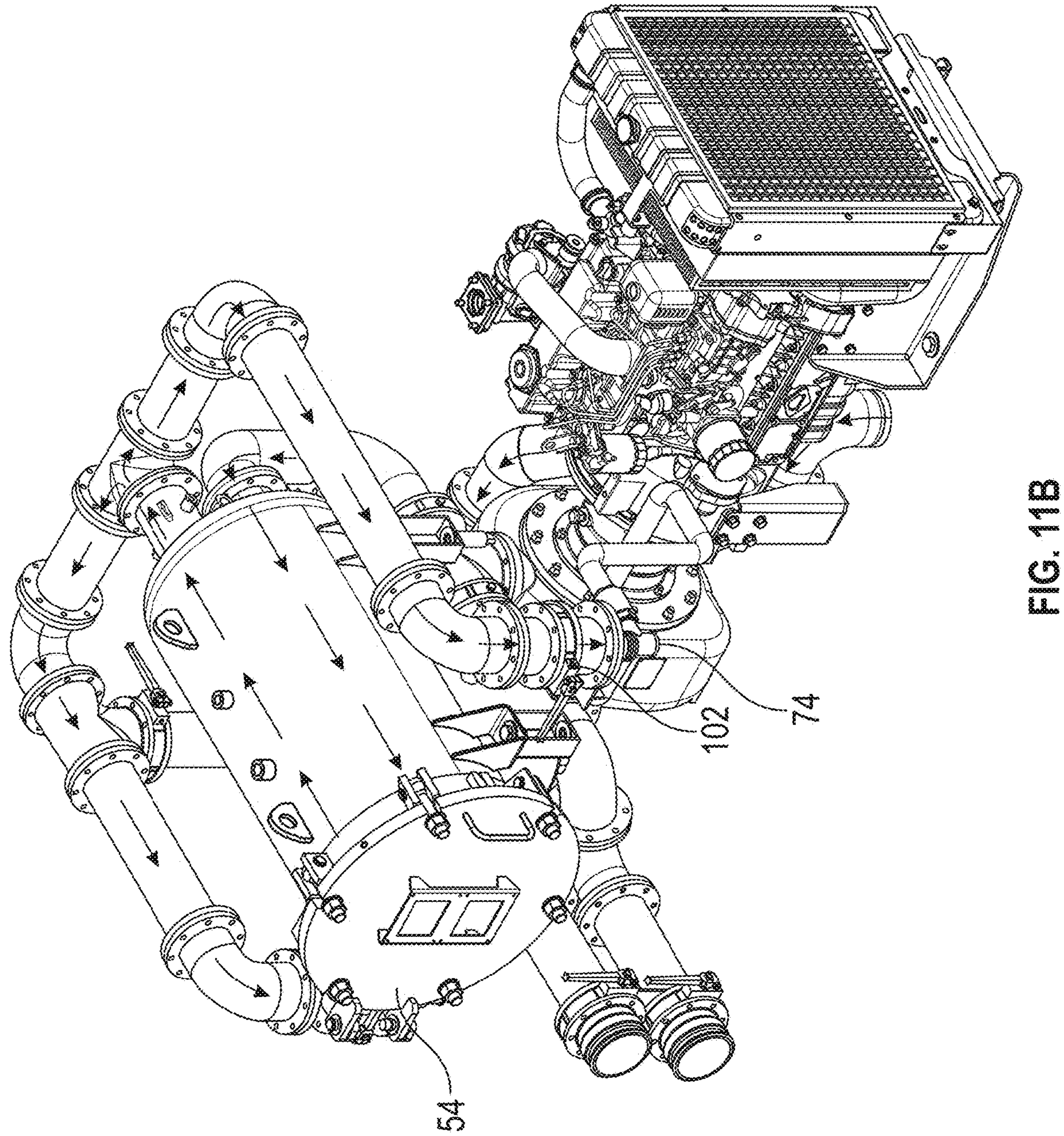
FIG. 11B is an isometric rear view of the pumping assembly of FIG. 11A.

Referring to FIGS. 11A-B, a configuration for retail delivery of fuel supplied by the vehicle's tank and subsequently filtered is depicted. In this configuration, air actuated valve (82), air actuated valve (84), as well as manual valve (100) and/or manual valve (102) are open, and the fuel travels along fluid pathway I. In fluid pathway I, the fuel travels through the main inlet (58), through valve (82) and into the pump (50), out of the pump (50) and through valve (84), and into the filter separator (54). The fuel then exits the filter separator (54) and flows through valve (100) and/or (102) to one or more connected hoses to provide fuel at a lower gallon per minute rate.

Figure 12A:
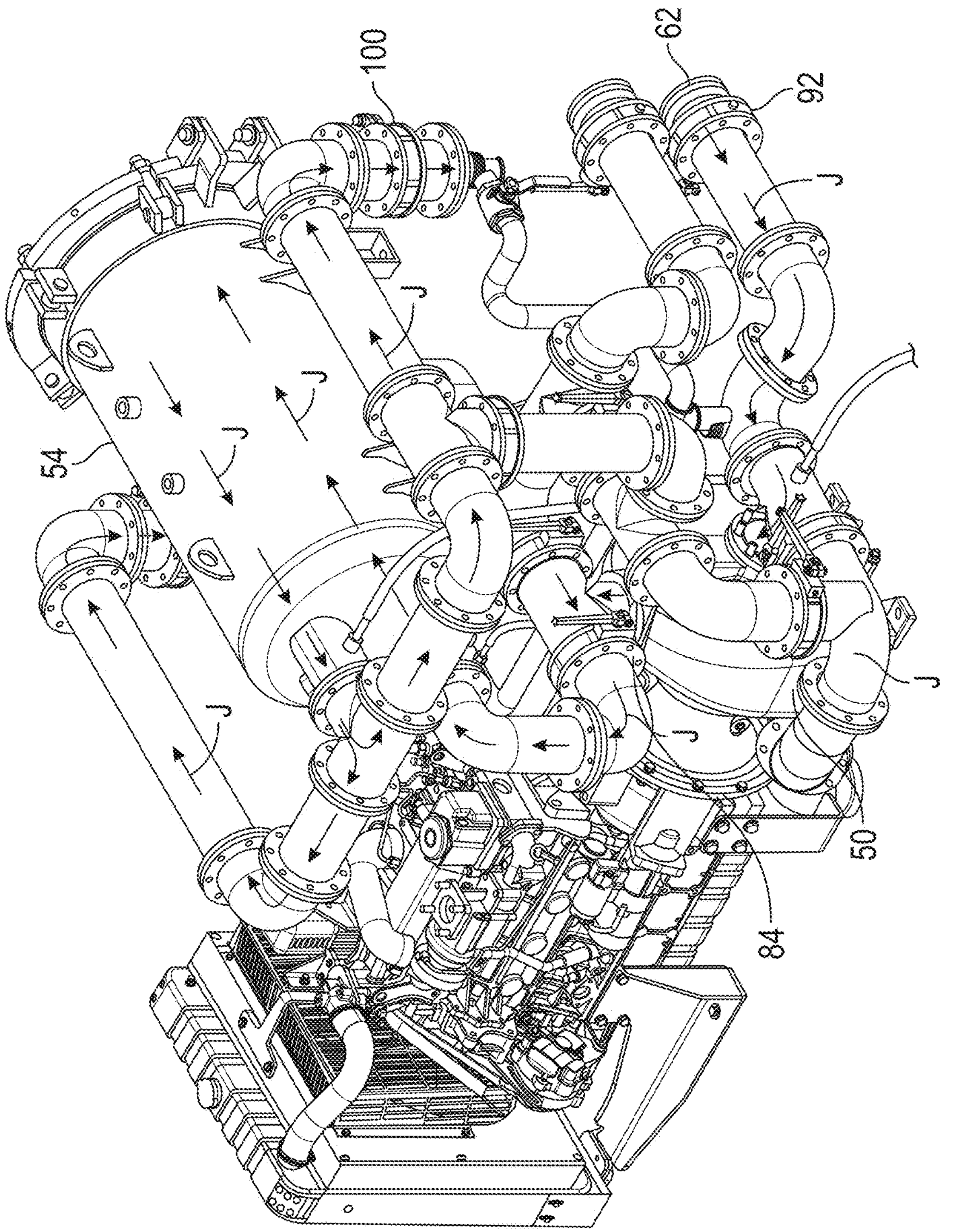
FIG. 12A is an isometric front view of the pumping assembly of FIGS. 2A-C in a configuration for retail delivery of fuel supplied by an auxiliary source and subsequently filtered.
Figure 12B:
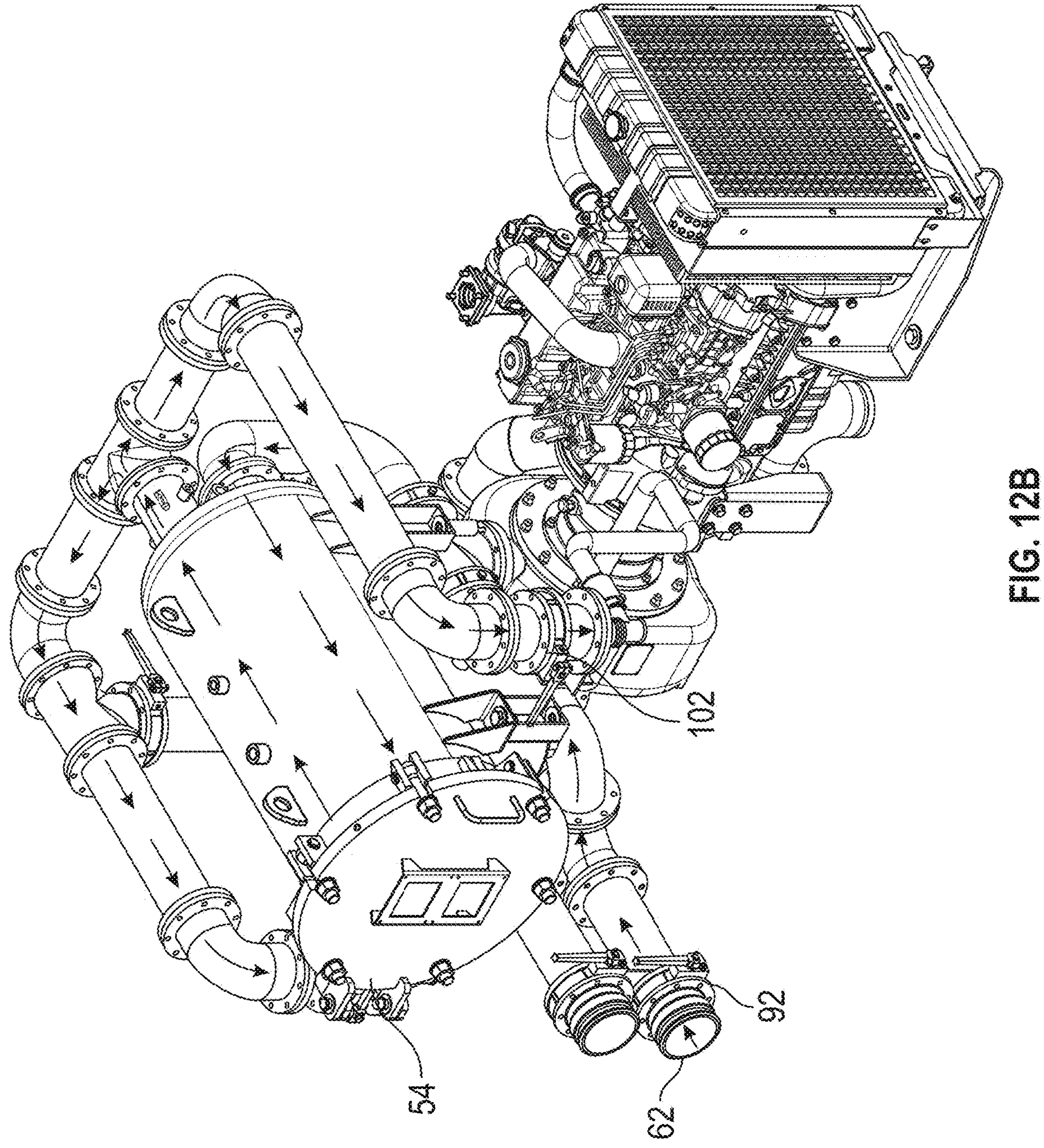
FIG. 12B is an isometric rear view of the pumping assembly of FIG. 12A.

Referring to FIGS. 12A-B, a configuration for retail delivery of fuel supplied by an auxiliary source and subsequently filtered is depicted. In this configuration, manual valve (92) adjacent auxiliary inlet (62) is open, and air actuated valve (84), and manual valve (100) and/or manual valve (102) are also open, such that the fuel travels along fluid pathway J. In fluid pathway J, the fuel travels through the auxiliary inlet (62), though valve (92) and into the pump (50), out of the pump (50) and through valve (84), and into the filter separator (54). The fuel then exits the filter separator (54) and flows through valve (100) and/or (102) to one or more connected hoses to provide fuel at a lower gallon per minute rate.

Any valves not indicated to be an open position in the above configurations are in a closed position.

Referring back to FIG. 2A, in the particular embodiment shown, a sensor (110) is located at the outlet of the filter separator (54) to measure the discharge pressure (psi), and a sensor (112) is located near the inlet to the pump (50) to measure the negative pressure (psi). Various sensors may be employed in this way throughout the assembly to provide information regarding various parameters, including fuel level, engine temperature, oil pressure, water level, engine RPM, battery voltage, pump inlet pressure, pump outlet pressure, and filter separator differential pressure.

Figure 13:
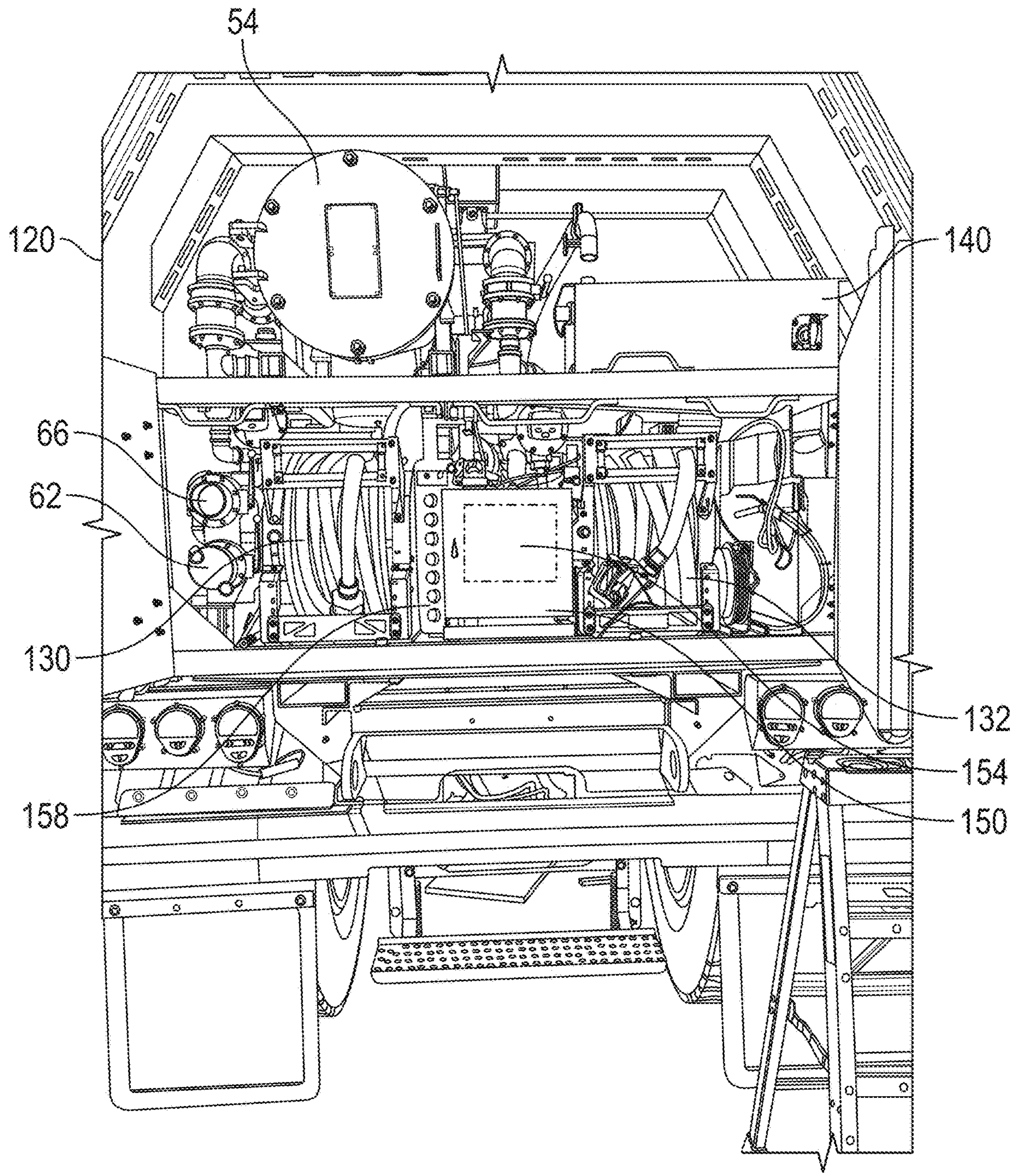
FIG. 13 is a rear view of the multi-configuration pumping assembly housed in a frame mounted on a vehicle.

As shown in FIG. 13, the frame (40) of the pumping assembly is designed to be mounted to the back of a vehicle (120). Though the assembly is shown mounted to a fuel tanker truck, it can be mounted to different vehicles, including trailers, flatbeds, and the like. In the embodiment shown, hoses (130, 132) are mounted on the lower portion of the frame (40). These hoses (130, 132) are connectible to the hose connectors (72, 74), typically for retail delivery.

In the particular embodiment illustrated, a control box (150) containing an internal display (154) is mounted between the hoses (130, 132), as is a button panel (158) containing a set of buttons corresponding to the pneumatically operated valves (80), (82), (84), (86), (88), and (90) in order to control those valves. The sensors (110, 112), or any other sensors, communicate with the control box (150) via hardwire or wirelessly in order to provide it with the information measured by those sensors, which is displayed on the display panel (154).

A battery box (140) mounted to the frame (40), which contains two deep cycle batteries to produce a 24 volt system, provides necessary power.

By utilizing the above-described controls and sensors, the system is able to control, monitor, and display various parameters of the assembly, including valve position, flow rate, fuel level, engine temperature, oil pressure, engine preheater, preheater indicator light, engine start/stop switch, water level warning light, control system illumination, engine RPM, engine hours, battery voltage, pump inlet pressure, pump outlet pressure, and filter separator differential pressure.

By using the aforementioned pumping assembly employing a specifically structured manifold with a sequence of strategically placed valves, one is able to switch between at least ten different pumping configurations to control the flow of fuel from a tanker or other vehicle, as needed at the time.

It should be understood that the foregoing is illustrative and not limiting, and that obvious modifications may be made by those skilled in the art without departing from the spirit of the invention. Although the invention has been described with reference to embodiments herein, those embodiments do not limit the scope of the invention. Accordingly, reference should be made primarily to the accompanying claims, rather than the foregoing specification, to determine the scope of the invention.

What is claimed is:

1. A multifunctional pumping assembly for a fuel delivery vehicle, comprising:

a main inlet and an auxiliary inlet;

a main outlet;

one or more hose connections for connecting one or more corresponding hoses to the assembly;

a pump for pumping fluid through the assembly;

a filter separator for removing contaminants from the fluid being pumped through the assembly by said pump;

a first main valve through which fluid flows from said main inlet to said pump when in an open position;

a second main valve through which fluid flows from said pump to said filter separator when in an open position;

a third main valve through which fluid from said pump flows when in an open position;

a fourth main valve through which fluid from said filter separator flows when in an open position;

a fifth main valve through which fluid flows from said fourth main valve toward said main outlet when in an open position;

a sixth main valve through which fluid flows from said fourth main valve toward said main inlet when in an open position;

one or more main hose connection valves corresponding to said one or more hose connections through which fluid flows to the corresponding hose connection when in an open position; and one or more auxiliary hose connection valves corresponding to said one or more hose connections through which fluid from the corresponding hose connection flows when in an open position.

2. The multifunctional pumping assembly of claim 1, wherein said one or more hose connections comprise first and second hose connections, each said hose connection having a corresponding main hose connection valve and a corresponding auxiliary hose connection valve.

3. The multifunctional pumping assembly of claim 1, wherein:

said first, second, third fourth, fifth, and sixth main valves are pneumatically operated valves, and said main hose connection and auxiliary hose connection valves are manually operated valves.

4. The multifunctional pumping assembly of claim 1, wherein each of said valves is a butterfly valve.

5. The multifunctional pumping assembly of claim 1, further comprising an engine that drives said pump.

6. The multifunctional pumping assembly of claim 1, further comprising at least one sensor for measuring at least one parameter of the assembly.

7. The multifunctional pumping assembly of claim 6, wherein the at least one sensor comprises at least one of:

a sensor that measures discharge pressure at an outlet of said filter separator; and a sensor that measures negative pressure at an inlet of said pump.

8. The multifunctional pumping assembly of claim 1, further comprising a frame for mounting the pumping assembly to a vehicle.

9. The multifunctional pumping assembly of claim 8, further comprising one or more hoses secured to said frame.

10. The multifunctional pumping assembly of claim 8, further comprising a fuel truck to which said frame is mounted, wherein said vehicle is said fuel truck.

11. The multifunctional pumping assembly of claim 1, further comprising:

a main outlet valve through which fluid flows to said main outlet when in an open position; and an auxiliary inlet valve through which fluid flows from said auxiliary inlet.

12. The multifunctional pumping assembly of claim 11, wherein said main outlet and auxiliary inlet valves are manually operated valves.

13. The multifunctional pumping assembly of claim 11, further comprising:

a first fluid pathway along which fluid flows through said main inlet, through said first main valve, through said pump, through said second main valve, through said filter separator, through said fourth main valve, through said fifth main valve, through said main outlet valve, and through said main outlet;

a second fluid pathway along which fluid flows through said main inlet, through said first main valve, through said pump, through said third main valve, through said main outlet valve, and through said main outlet;

a third fluid pathway along which fluid flows through said auxiliary inlet, through said auxiliary inlet valve, through said pump, through said second main valve, through said filter separator, through said fourth main valve, through said fifth main valve, through said main outlet valve, and through said main outlet;

a fourth fluid pathway along which fluid flows through said auxiliary inlet, through said auxiliary inlet valve, through said pump, through said third main valve, through said main outlet valve, and through said main outlet;

a fifth fluid pathway along which fluid flows through said one or more hose connections, through said one or more auxiliary hose connection valves, through said pump, through said second main valve, through said filter separator, through said fourth main valve, through said sixth main valve, and through said main inlet;

a sixth fluid pathway along which fluid flows through said one or more hose connections, through said one or more auxiliary hose connection valves, through said pump, through said third main valve, through said fifth main valve, through said sixth main valve, and through said main inlet;

a seventh fluid pathway along which fluid flows through said auxiliary inlet, though said auxiliary inlet valve, through said pump, through said second main valve, through said filter separator, through said fourth main valve, through said sixth main valve, and through said main inlet;

an eighth fluid pathway along which fluid flows through said auxiliary inlet, through said auxiliary inlet valve, through said pump, through said third main valve, through said fifth main valve, through said sixth main valve, and through said main inlet;

a ninth fluid pathway along which fluid flows through said main inlet, through said first main valve, through said pump, through said second main valve, through said filter separator, and through said one more main hose connection valves; and a tenth fluid pathway along which fluid flows through said auxiliary inlet, though said auxiliary inlet valve, through said pump, through said second main valve, through said filter separator, and through said one more main hose connection valves.

14. The multifunctional pumping assembly of claim 13, wherein said one or more hose connections comprise first and second hose connections, each said hose connection having a corresponding main hose connection valve and a corresponding auxiliary hose connection valve.

15. The multifunctional pumping assembly of claim 13, wherein:

said first, second, third fourth, fifth, and sixth main valves are pneumatically operated valves, and said main outlet, auxiliary inlet, main hose connection, and auxiliary hose connection valves are manually operated valves.

16. The multifunctional pumping assembly of claim 13, wherein each of said valves is a butterfly valve.

17. The multifunctional pumping assembly of claim 13, further comprising an engine that drives said pump.

18. The multifunctional pumping assembly of claim 13, further comprising at least one sensor for measuring at least one parameter of the assembly.

19. The multifunctional pumping assembly of claim 13, further comprising a frame for mounting the pumping assembly to a vehicle.

20. The multifunctional pumping assembly of claim 19, further comprising one or more hoses secured to said frame.

21. The multifunctional pumping assembly of claim 19, further comprising a fuel truck to which said frame is mounted, wherein said vehicle is said fuel truck.

* * * * *